US012387028B2

(12) United States Patent
Roy et al.

(10) Patent No.: US 12,387,028 B2
(45) Date of Patent: Aug. 12, 2025

(54) DATA PATH CIRCUIT DESIGN USING REINFORCEMENT LEARNING

(71) Applicant: NVIDIA Corporation, Santa Clara, CA (US)

(72) Inventors: Rajarshi Roy, Milpitas, CA (US); Saad Godil, Milpitas, CA (US); Jonathan Raiman, Seattle, WA (US); Neel Kant, Santa Clara, CA (US); Ilyas Elkin, Sunnyvale, CA (US); Ming Y. Siu, Santa Clara, CA (US); Robert Kirby, San Francisco, CA (US); Stuart Oberman, Sunnyvale, CA (US); Bryan Catanzaro, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 821 days.

(21) Appl. No.: 17/517,612

(22) Filed: Nov. 2, 2021

(65) Prior Publication Data
US 2023/0139623 A1 May 4, 2023

(51) Int. Cl.
*G06F 30/394* (2020.01)
*G06F 30/327* (2020.01)
*G06N 20/00* (2019.01)

(52) U.S. Cl.
CPC .......... *G06F 30/394* (2020.01); *G06F 30/327* (2020.01); *G06N 20/00* (2019.01)

(58) Field of Classification Search
CPC ...... G06F 30/394; G06F 30/327; G06F 30/32; G06F 30/337; G06F 2115/10; G06F 30/27; G06N 20/00; G06N 3/0495; G06N 3/084; G06N 3/006; G06N 3/044; G06N 3/0464; G06N 3/092
See application file for complete search history.

(56) References Cited

U.S. PATENT DOCUMENTS

| | | | | |
|---|---|---|---|---|
| 8,527,920 | B1 * | 9/2013 | Choudhury | G06F 30/327 716/104 |
| 9,792,397 | B1 * | 10/2017 | Nagaraja | G06F 30/32 |
| 11,599,699 | B1 * | 3/2023 | Roberto | G06F 30/398 |
| 11,984,910 | B1 * | 5/2024 | Fan | G06N 3/044 |
| 2021/0073456 | A1 * | 3/2021 | Nath | G06F 30/3953 |
| 2021/0342516 | A1 * | 11/2021 | Ren | G06N 3/045 |
| 2022/0229960 | A1 * | 7/2022 | Nath | G06F 30/3315 |
| 2023/0139623 | A1 * | 5/2023 | Roy | G06N 3/044 716/104 |

OTHER PUBLICATIONS

"Approximate Logic Synthesis: A Reinforcement Learning-Based Technology Mapping Approach", Ghasem Pasandi, Shahin Nazarian, and Massoud Pedram, Department of Electrical and Computer Engineering, Feb. 1, 2019.*
Main reference (Year: 2019).*

* cited by examiner

*Primary Examiner* — Nha T Nguyen
(74) *Attorney, Agent, or Firm* — Lowenstein Sandler LLP

(57) ABSTRACT

Apparatuses, systems, and techniques for designing a data path circuit such as a parallel prefix circuit with reinforcement learning are described. A method can include receiving a first design state of a data path circuit, inputting the first design state of the data path circuit into a machine learning model, and performing reinforcement learning using the machine learning model to output a final design state of the data path circuit, wherein the final design state of the data path circuit has decreased area, power consumption and/or delay as compared to conventionally designed data path circuits.

20 Claims, 20 Drawing Sheets

DATA PATH CIRCUIT DESIGN USING REINFORCEMENT LEARNING

TECHNICAL FIELD

At least one embodiment pertains to use of machine learning to perform and facilitate circuit design. For example, at least one embodiment pertains to technology for data path circuit design utilizing reinforcement learning, according to various novel techniques described herein.

BACKGROUND

Many types of circuits can include data paths or data path circuits—e.g., arithmetic logic units or multipliers that can perform data processing operations. For example, data path circuits can include parallel prefix circuits (e.g., gray to binary converter, adder, decrementer, incrementer, priority encoder, etc.) that process or synthesize data over data paths. Prefix computation is a very useful and basic operation that is used in various applications, such as image processing, cryptography, processor allocation, biological sequence comparison, binary addition, design of silicon compilers, job scheduling, loop parallelization, polynomial evaluation, and sorting.

Design of data path circuits look to decrease a delay (e.g., an amount of time the data path circuit takes to output a value given an input) and an area (e.g., an amount of space the data path circuit takes) while avoiding increases in power consumption of the circuit. As delay of a data path circuit is decreased, the area and power consumption of the data path circuit can be affected—e.g., as delay of a data path circuit decreases, the area of the data path circuit can increase. Accordingly, a design of data path circuits looks to optimize the delay, area, and power consumption of the data path circuit.

The optimization of prefix circuits is challenging as their large design space grows exponentially with input length and is intractable to enumerate. As a result, exhaustive search approaches do not scale beyond small input lengths. Several regular prefix circuit structures have been proposed that trade off logic level, maximum fanout and wiring tracks. Another set of algorithms optimize prefix circuit size and level properties. However, prefix circuit level and maximum fanout properties do not map to circuit area, power and delay due to physical design complexities such as capacitive loading and congestion. Conventional methods for data path circuit design do not fully optimize the delay, area, and power consumption of the data path circuit.

BRIEF DESCRIPTION OF DRAWINGS

Various embodiments in accordance with the present disclosure will be described with reference to the drawings, in which.

DETAILED DESCRIPTION

Figure 1:
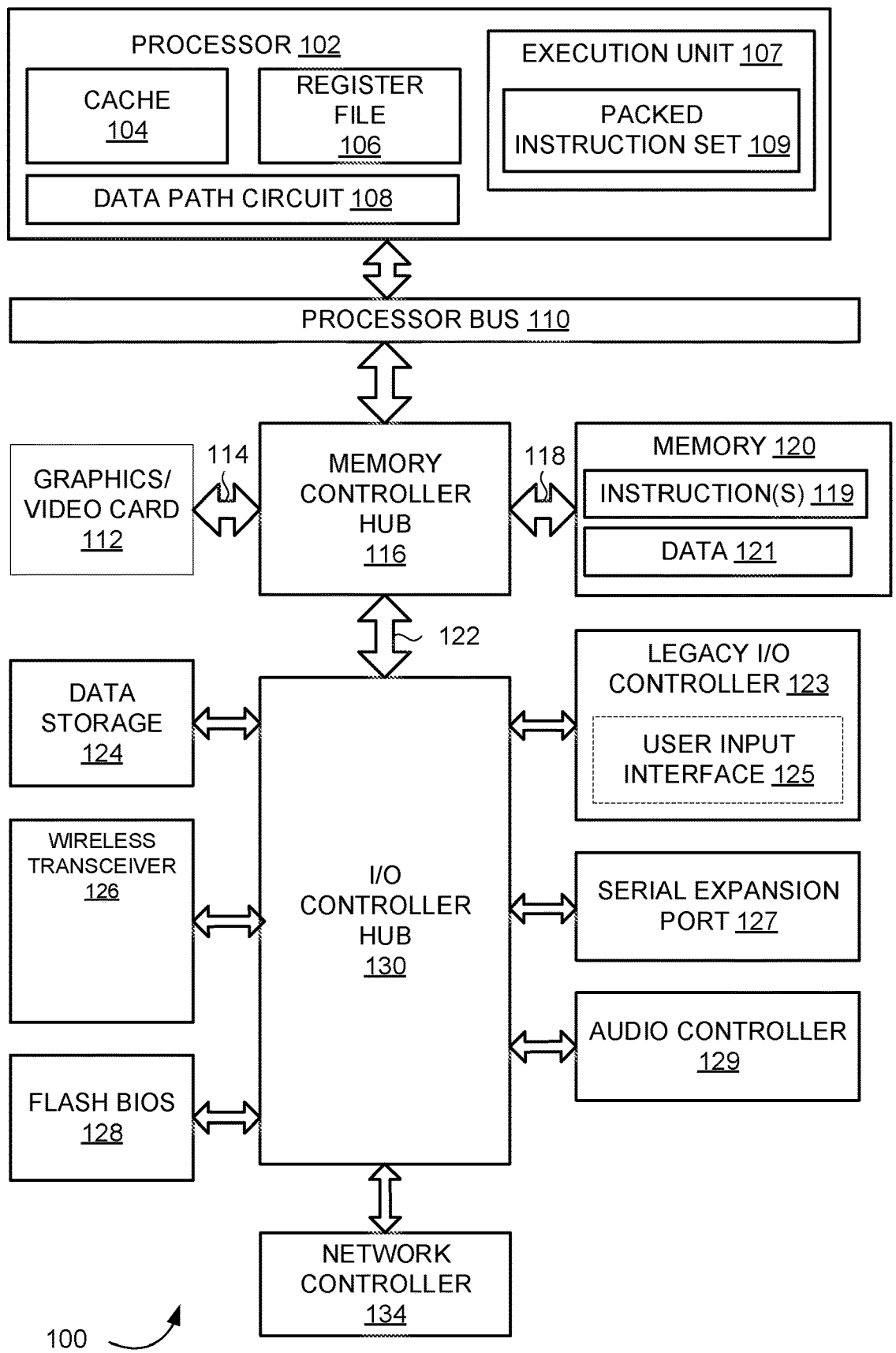
FIG. 1 is an example system architecture, in accordance with at least some embodiments.

Several fundamental digital design building blocks such as adders, priority encoders, incrementers, decrementers and gray-to-binary code converters can be reduced to prefix-sum computations and implemented as data path circuits such as prefix circuits (e.g., parallel prefix circuits). The optimization of data path circuits such as prefix circuits for area, delay and power can be important in digital hardware design. Embodiments described herein provide a system and method to design data path circuits (e.g., parallel prefix circuits) that are optimized for area, power and/or delay using reinforcement learning.

Some memory systems store or communicate data—e.g., for a host system. The memory system can include data paths that communicate data from one component of the memory system to another component of the memory system. In some embodiments, the memory system can process or synthesize data at data path circuits. For example, the memory system can include prefix circuits—e.g., adders, decrementers, incrementers, gray to binary converters, priority encoders, etc.—to process and synthesize data. For example, an adder can be utilized to calculate addresses or table indices for a process of the memory system. In one example, the prefix circuits can be utilized in a parallel configuration to reduce a time to perform prefix computations—e.g., as parallel prefix circuits.

Each data path circuit can have an associated area (e.g., size of the data path circuit in the memory system), power consumption (e.g., an amount of power consumed by the data path circuit while in operation), and delay (e.g., an amount of time to generate an output from a given number of inputs). To increase the performance of a circuit (e.g., for a memory system), data path circuits can be designed to reduce the area, power consumption and/or delay. In some examples, though, reducing one property of the data path circuit can affect another property of the data path circuit—e.g., reducing the delay of the data path circuit can cause the data path circuit to be larger in area or consume more power. Accordingly, in embodiments data path circuits can be designed to balance the tradeoffs between reduced area, power consumption and/or delay—e.g., designed or optimized for the smallest amount of area for a respective delay or power consumption.

In some examples, conventional methods for design of data path circuits are ineffective at designing optimized data path circuits. For example, some conventional methods propose prefix circuit structures that optimize logic level, maximum fanout, and wiring tracks. However, optimizing logic level, fanout, and wiring tracks can fail to optimize for area, delay, and/or power due to physical design complexities of prefix structures—e.g., due to capacitive loading or congestion. Some conventional methods for data path circuit design can include utilizing heuristic rules for circuit design that either attempt to predict physical metrics for circuit designs or that are perform random modifications to circuit designs. The circuit designs generated using such heuristics may be evaluated using inaccurate analytical models. These analytical models and heuristic rules can be ineffective at producing optimal circuits as they rely on hand-crafted heuristics or are limited by analytical evaluation metrics. For example, prefix circuits designed using analytical evaluation metrics degrade in quality (e.g., see an increase in delay, area, or power consumption) when they undergo physical synthesis—e.g., when the analytical model is put through a simulation and converted to a predicted physical model. Because physical synthesis is more intensive than analytical evaluations, conventional methods generally cannot be scaled for physical synthesis. Accordingly, conventional circuit design techniques for data path circuits are not optimized and reduce the performance of systems that use these data path circuits (e.g., a memory system).

Aspects of the present disclosure address the above and other deficiencies by designing data path circuits (e.g., parallel prefix circuits) using reinforcement learning with a machine learning model. For example, a first processing device (e.g., executing an agent) can give a machine learning model an initial design of a data path circuit. The machine learning model can modify the design to generate a second design for the data path circuit. In some examples, modifying the design can include modifying a prefix graph associated with the data path circuit—e.g., modifying a node of the prefix graph representing the data path circuit where each node represents one or more components of the data path circuit. For example, the machine learning model can modify the prefix graph represented by the initial design by adding or removing a node to generate a second prefix graph representing the second design. After the modification, the first processing device or a second processing device can process the first design and the second design to determine one or more metrics associated with the respective designs. For example, the first or second processing device can determine an area, power, and/or delay associated with the initial design and the second design generated by the machine learning model. In some embodiments, a second machine learning model is used to predict the area, power and/or delay associated with the initial and second circuit designs. In some embodiments, a circuit synthesis tool is used to predict the area, power, and/or delay of the initial and second circuit designs.

The first or second processing device can generate a reward (e.g., parameter) that indicates a net change in area, delay, and/or power based transitioning from the initial design to the second design. The reward can be used to update a training of the machine learning model e.g., the machine learning model can undergo reinforcement learning based on the received reward. For example, the machine learning model can receive the reward, determine that the previous change caused the area, delay, and/or power of the data path circuit to decrease, and update weights of one or more nodes of the machine learning model. The updated machine learning model may then modify the second design of the data path circuit to generate a third data path circuit. This process may be repeated, and the reinforcement learning of the data path circuit design using the machine learning model can continue until a determination is made that no further improvements are being output (e.g., there are no additional modifications to the design that reduce the delay, area, and/or power of the data path circuit) or that the delay, area, and/or power of the data path circuit satisfies a target delay, area, and/or power for the data path circuit—e.g., until the data path circuit design is optimized for a respective delay, area, and/or power constraint.

Embodiments avoid the use of hand-crafted heuristics (e.g., such as the heuristics for pruning) that are applied in conventional circuit design techniques. In embodiments, a machine learning model can be trained to perform circuit design for data path circuits via reinforcement learning techniques, as described herein. That is, the machine learning model learns to modify the data path circuit in a way that optimizes the current design of the data path circuit—e.g., to modify the data path circuit to reduce the area, power consumption and/or delay of the data path circuit. For example, the machine learning model may be trained based on receiving a reward indicating one or more improved or decreased circuit design optimization metric values and determining whether a previous modification of the data path circuit design resulted in an improved or decreased circuit design optimization metric value, and then adjusting nodes of the machine learning model based on the reward. In some examples, the machine learning model can be trained using model (based/free), value/policy based, or on/off policy reinforcement learning techniques. In other embodiments, the machine learning model can utilize deep neural networks (e.g., a convolutional neural network, transformer, graph neural network etc.) and/or decision trees. By utilizing reinforcement learning, the design of the data path circuit can be more optimized more thoroughly than compared with other solutions—e.g., the delay, area, and/or power of the data path circuit can be reduced as compared to data path circuits designed using traditional approaches. Embodiments produce circuit designs that have smaller area and power for given delays and that have lower delays for given area and power as compared to prior approaches at circuit design of data path circuits. Accordingly, the overall performance of systems such as a memory system can increase with use of embodiments of the present disclosure, as designed data path circuits can consume less power, have less delay, and/or consume less area as compared to traditionally designed data path circuits.

FIG. 1 illustrates a computer system 100, in accordance with at least one embodiment. In at least one embodiment, computer system 100 may be a system with interconnected devices and components, an SOC, or some combination thereof. In at least one embodiment, computer system 100 is formed with a processor 102 that may include execution units to execute an instruction. In at least one embodiment, computer system 100 may include, without limitation, a component, such as processor 102 to employ execution units including logic to perform algorithms for processing data. In at least one embodiment, computer system 100 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used.

In at least one embodiment, computer system 800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 100 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 100 may include, without limitation, processor 102 that may include, without limitation, one or more execution units 107 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 100 is a single processor desktop or server system. In at least one embodiment, computer system 100 may be a multiprocessor system. In at least one embodiment, processor 102 may include, without limitation, a CISC microprocessor, a RISC microprocessor, a VLIW microprocessor, a processor implementing a combination of instruction sets, or any other processor device, such as a digital signal processor, for example. In at least one embodiment, processor 102 may be coupled to a processor bus 110 that may transmit data signals between processor 102 and other components in computer system 100.

In at least one embodiment, processor 102 may include, without limitation, a Level 1 ("L1") internal cache memory ("cache") 104. In at least one embodiment, processor 102 may have a single internal cache or multiple levels of internal cache. In at least one embodiment, cache memory may reside external to processor 102. In at least one embodiment, processor 102 may also include a combination of both internal and external caches. In at least one embodiment, a register file 106 may store different types of data in various registers including, without limitation, integer registers, floating point registers, status registers, and instruction pointer register.

In at least one embodiment, processor 102 can include data path circuits 108. In some examples, data path circuits 108 can be examples of parallel prefix circuits. For example, data path circuits 108 can be adders, incrementers, decrementers, priority encoders, and/or gray to binary converters, possibly including connected logic. In some examples, data path circuits 108 can also be located in other components of computer system 100. In some embodiments, data path circuits 108 can consume power, take up a respective area, and have a respective delay. In some embodiments, the data path circuit 108 delay can be inversely related to a clock frequency of a component of computer system 108—e.g., the delay of data path circuit 108 can be utilized to set a clock frequency for a component of computer system 108. In some embodiments, the design of data path circuits 108 can be performed via reinforcement learning using a machine learning model that is trained over time to reduce or optimize the area, power consumption and/or delay of the data path circuit 108. For example, during design of the data patch circuit 108, the machine learning model can modify a design of the data path circuit 108 and determine if the modification resulted in a reduction of area, power, or delay of the given data path circuit 108. The computer system 100 can benefit from optimized data path circuits that were designed using reinforcement learning. That is, machine learning model can be updated based on whether a resulting modification to the design of the data path circuit resulted in a reduction of the area, delay, and/or power of the data path circuit 108. Over several iterations, the machine learning model can be trained to choose modifications that result in the best reductions of area, power consumption and/or delay of the data path circuit. In some embodiments, the machine learning model can be used until the area, power consumption and/or delay of the data path circuit 108 satisfies a target metric—e.g., the area, power consumption and/or delay of the data path circuit 108 satisfies a target area, power consumption and/or delay. By utilizing reinforcement learning to design the data path circuit 108, the design of data path circuit 108 can be optimized and the performance of the computer system 100 can be improved.

In at least one embodiment, execution unit 107, including, without limitation, logic to perform integer and floating point operations, also resides in processor 102. Processor 102 may also include a microcode ("ucode") read only memory ("ROM") that stores microcode for certain macro instructions. In at least one embodiment, execution unit 102 may include logic to handle a packed instruction set 109. In at least one embodiment, by including packed instruction set 109 in an instruction set of a general-purpose processor 102, along with associated circuitry to execute instructions, operations used by many multimedia applications may be performed using packed data in a general-purpose processor 102. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 100 may include, without limitation, a memory 120. In at least one embodiment, memory 120 may be implemented as a DRAM device, an SRAM device, flash memory device, or other memory device. Memory 120 may store instruction(s) 119 and/or data 121 represented by data signals that may be executed by processor 102.

In at least one embodiment, a system logic chip may be coupled to processor bus 110 and memory 120. In at least one embodiment, the system logic chip may include, without limitation, a memory controller hub ("MCH") 116, and processor 102 may communicate with MCH 116 via processor bus 110. In at least one embodiment, MCH 116 may provide a high bandwidth memory path 118 to memory 120 for instruction and data storage and for storage of graphics commands, data and textures. In at least one embodiment, MCH 116 may direct data signals between processor 102, memory 120, and other components in computer system 100 and to bridge data signals between processor bus 110, memory 120, and a system I/O 122. In at least one embodiment, system logic chip may provide a graphics port for coupling to a graphics controller. In at least one embodiment, MCH 116 may be coupled to memory 120 through high bandwidth memory path 118 and graphics/video card 112 may be coupled to MCH 116 through an Accelerated Graphics Port ("AGP") interconnect 114.

In at least one embodiment, computer system 100 may use system PO 122 that is a proprietary hub interface bus to couple MCH 116 to I/O controller hub ("ICH") 130. In at least one embodiment, ICH 130 may provide direct connections to some I/O devices via a local I/O bus. In at least one embodiment, local I/O bus may include, without limitation, a high-speed I/O bus for connecting peripherals to memory 120, a chipset, and processor 102. Examples may include, without limitation, an audio controller 129, a firmware hub ("flash BIOS") 128, a wireless transceiver 126, a data storage 124, a legacy I/O controller 123 containing a user input interface 125 and a keyboard interface, a serial expansion port 127, such as a USB, and a network controller 134. Data storage 124 may comprise a hard disk drive, a floppy disk drive, a CD-ROM device, a flash memory device, or other mass storage device.

Figure 2:
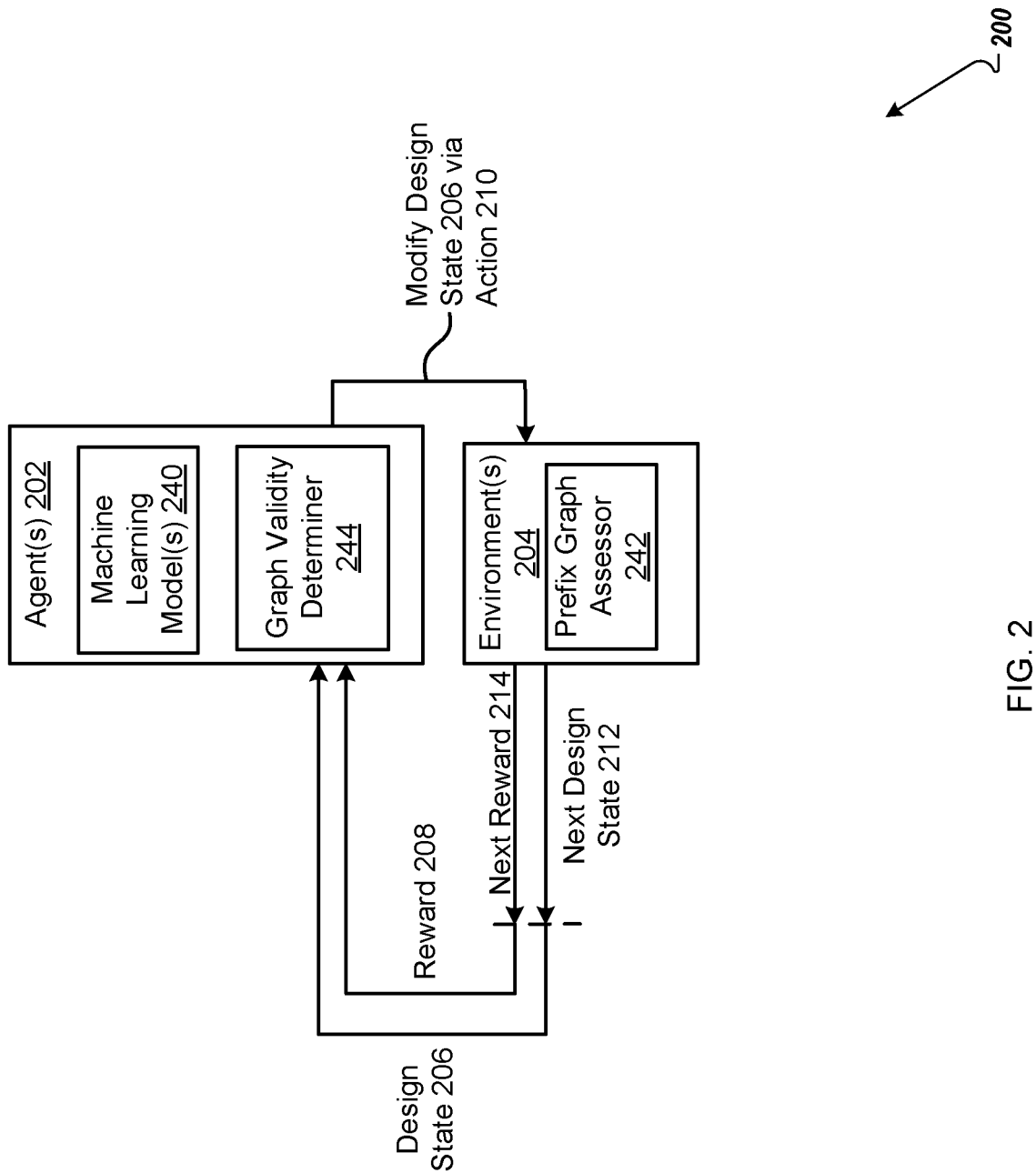
FIG. 2 illustrates an example system architecture for reinforcement learning, in accordance with at least some embodiments.

FIG. 2 illustrates an example system 200 for performing reinforcement learning to generate an improved design of a data path circuit, according to at least one embodiment. In some embodiments, the system is or includes a Q-network. In some embodiments, the system 200 is or includes a deep Q-network.

Reinforcement learning (RL) is a class of algorithms applicable to sequential decision making tasks. RL makes use of the Markov Decision Process (MDP) formalism wherein an agent 202 attempts to optimize a function in its environment 204. An MDP can be completely described by a state space S (with states $s \in S$), an action space A ($a \in A$), a transition function T: $S \times A \rightarrow S$ and a reward function R: $S \times A \rightarrow \mathbb{R}$. In an MDP, an episode evolves over discrete time steps t=0, 1, 2, . . . , n, where the agent 202 observes a state $s_t$ (206) and responds with an action $a_t$ (210) using a policy $\pi(a_t|s_t)$. The environment 204 provides to the agent 202 the next state $s_{t+1} \sim T(s_t, a_t)$ 212 and the reward $r_t = R(s_t, a_t)$ 214. The agent 202 is tasked with maximizing the return (cumulative future rewards) by learning an optimal policy $\pi^*$.

A Q-network may be trained via a process referred to as Q-learning. Q learning is a reinforcement learning process that causes a model to perform a sequence of actions that will eventually generate a maximum total reward. This total reward is also called the Q-value. A function for computing the Q value may be as follows:

$$Q(s_t, \alpha_t) \leftarrow r_t + \gamma \max_\alpha Q(s_{t+1}, \alpha)$$

The above equation states that the Q-value yielded from being at state $s_t$ (206) and performing action $\alpha_t$ (210) is the immediate reward $r(s_t, a_t)$ (214) plus the highest Q-value possible from the next state $s_{t+1}$ (212), state where $\gamma$ is the discount factor which controls the contribution of rewards further in the future. The recursive definition of Q-functions allows the expression of $Q(s_{t+1}, a_{t+1})$ to be unrolled into future states, as follows:

$$Q(s_t, \alpha_t) = r_t + \gamma r_{t+1} + \ldots + \gamma^{n-1} r_{t+n-1} + \gamma^n Q(s_{t+n}, \alpha_{t+n})$$

The machine learning model 240 of the agent 202 learns to predict Q ($s_t$, $a_t$) by performing the following update step:

$$Q(s_t, a_t) \leftarrow Q(s_t, a_t) + \alpha \left[ r_{t+1} + \gamma \max_a Q(S_{t+1}, a) - Q(s_t, a_t) \right]$$

where $\alpha$ represents learning rate or step size, which controls to what extent newly acquired information overrides old information.

In embodiments, the Q value of a state-action pair ($s_t$, $a_t$) under a policy $\pi$ is defined to be the expected return if the action $a_t$ 210 is taken at state $s_t$ 206 and future actions are taken using the policy $\pi$, as set forth below:

$$Q^\pi(s_t, \alpha_t) = \mathbb{E} [r_t + \gamma r_{t+1} + \gamma^2 r_{t+2} + \ldots], \gamma \in [0,1]$$

In embodiments, the discount factor $\gamma \in [0,1]$ balances short-term versus long-term rewards. The Q-learning algorithm may start the agent 202 with a random policy and uses the experience gathered during its interaction with the environment ($s_t$, $a_t$, $r_t$, $s_{t+1}$) 204 to iterate towards an optimal policy by updating Q with a learning rate $\alpha \in [0,1]$:

$$Q(s_t, a_t) \leftarrow (1-\alpha) * Q(s_t, a_t) + \alpha * \left( r_t + \gamma \max_{a'} Q(s_{t+1}, a') \right)$$

The policy for a Q-learning agent 202 may be represented as $\pi(\cdot|s_t) = \text{argmax } Q(s_t, \alpha)$. In one embodiment, a $\epsilon$-greedy policy, where random actions a are chosen with a probability $\epsilon$ to increase exploration in the state space is used. In one embodiment, $\epsilon$ is annealed to zero during the course of training and is zero when performing evaluation. In one embodiment, multiple explorations can be done in parallel with a range of $\epsilon$ values.

Deep Q-learning is an extension of Q-learning that implements one or more machine learning models (e.g., machine learning model 240) such as neural networks to essentially approximate the aforementioned Q values. In deep Q-learning, one or more artificial neural networks (e.g., machine learning model 240) may be used to approximate the aforementioned Q-value function. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. modifications to design state of prefix circuits). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In embodiments, a deep Q-network (DQN) may stabilize training using a second target network to estimate the Q values of ($s_{t+1}$, a'). The second target network may be updated less frequently than a first network. In embodiments, the DQN may sample an experience replay buffer. In one embodiment, a first machine learning model is used to determine a prediction and a second neural network is used to determine a target. The second neural network may have a same architecture as the first neural network in embodiments. However, in an embodiment the second neural network may have frozen parameters while the first neural network may have variable parameters. In an embodiment, the second neural network is updated less frequently than the first neural network. In one embodiment, a double-DQN algorithm is used, which may further improve training by reducing overestimations in the DQN.

In some embodiments, system 200 can include agent (e.g., an actor, a circuit modifier, etc.) 202 and environment (e.g., a simulation environment, a circuit synthesizer, etc.) 204. In some embodiments, the agent 202 can include one or more machine learning model 240. The machine learning model 240 may be, for example a deep neural network (e.g., a convolutional neural network, transformer, graph neural network etc.) or decision trees. For example, the machine learning model 240 may be a neural network of a deep Q-network.

In some examples, system 200 can be utilized to design a data path circuit 108 as described with reference to FIG. 1. In embodiments, the optimization of data path circuits (e.g., prefix circuits) is framed as an RL task by creating an MDP for their construction. For example, the RL system 200 may be trained to select a design for parallel-prefix adders (e.g., to design an area-delay minimized pareto frontier of adders with possible connected logic included). In some embodiments, agent 202 is configured to modify a design of a data path circuit and train the machine learning model 240 based on the modifications. In some embodiments, agent 202 can execute on a processing device such as a graphical processing unit (GPU) or a central processing unit (CPU). In some embodiments, the system 200 can include multiple agents 202 that may operate in parallel and share learning. Each agent 202 may execute on the same or a different processing device and/or the same or a different core of a processing device. Each agent may perform a modification of the data path circuit in parallel—e.g., multiple agents 202 may concurrently modify the data path circuit. This may decrease an amount of time that it takes to find a target or optimal data path circuit design. In some embodiments, the agent 202 (or agents) can receive a design state 206 of the data path circuit. Upon receiving the design state 206, the agent 202 (or agents) can modify the design state 206 via an action 210. Each agent 202 may output a different action 210 in embodiments. In some embodiments, the action 210 can be determined for the agent 202 by the machine learning model 240 (e.g., such as a deep neural network). The agent 202 can also be configured to output a modified state of the data path circuit to the environment 204.

In embodiments, the design of a data path circuit 108 (e.g., a prefix circuit such as a parallel prefix adder) can be represented using a prefix graph. A prefix graph is a directed acyclic graph (DAG) in which edges may represent signals or signal pairs and nodes may represent logic operators. For example, parallel prefix computations can be represented as a directed acyclic parallel prefix graph where every computation unit $z_{i:j}$ is a graph node that performs a single operation on two inputs: $z_{i:j} = z_{i:k} \circ z_{k-1:j}$, where ∘ represents an operation such as a sum operation, a carry operation, a difference operation, and so on.

Accordingly, the agent 202 can receive a prefix graph representing an initial design state 206 of a data path circuit. The agent 202 may then modify the prefix graph (e.g., using a machine learning model 240) and output a new prefix graph that represents a modified state of the data path circuit via action 210. In embodiments, modifying the prefix graph may include adding a node, removing a node, or moving a node in the prefix graph.

Figure 3:
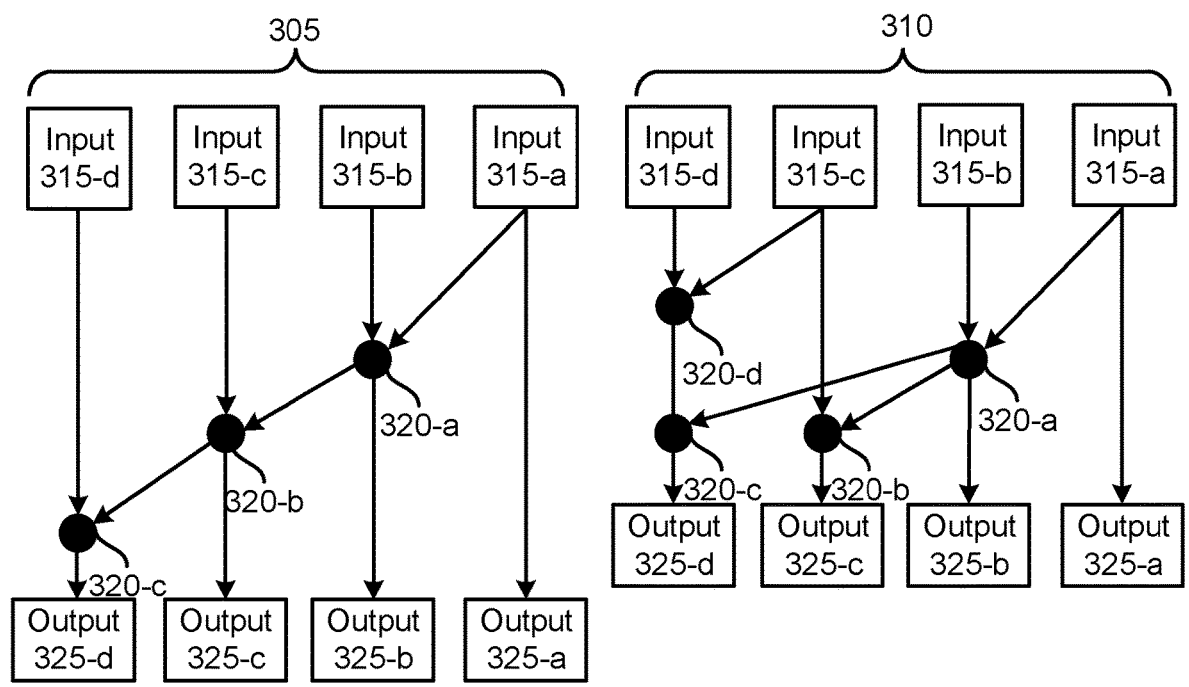
FIG. 3 illustrates an example prefix graph modification, in accordance with at least some embodiments.

FIG. 3 illustrates an example prefix graph modification, in accordance with at least some embodiments. A data path circuit can be represented by a prefix graph 305, 310, where prefix graph 305 represents an initial state of a circuit design for a data path circuit (e.g., such as an adder), and prefix graph 310 represents a modified or updated state of the data path circuit. In a prefix problem, n inputs $x_{n-1}, x_{n-2}, \ldots x_0$ and an arbitrary associative operator are used to compute n outputs $y_i = x_i \circ x_{i-1} \circ \ldots \circ x_0$, $i = 0, \ldots, n-1$. Thus, each output $y_i$ is dependent on all inputs $x_j$ of the same or lower index ($j \leq i$).

In an example, an N-input prefix-sum computation can be performed in several ways due to the associativity of the operator. For example, two of the ways the 4-input prefix sum can be computed are:

$$y_0 = x_0, y_1 = x_1 \circ y_0, y_2 = x_2 \circ y_1, y_3 = x_3 \circ y_2$$

$$y_0 = x_0, y_1 = x_1 \circ y_0, y_2 = x_2 \circ y_1, z_{3:2} = x_3 \circ x_2, y_3 = z_{3:2} \circ y_1$$

In this example, introducing the additional term $z_{3:2}$ breaks the dependency of $y_3$ on $y_2$ and allows it to be computed in parallel with $y_2$, thus the term parallel prefix. Embodiments denote $z_{i:j}$ to represent $x_i \circ x_{i-1} \circ \ldots \circ x_j$. Then the outputs $y_i$ can be rewritten as $z_{i:0}$ and inputs $x_i$ can be rewritten as $z_{i:i}$. Note that $y_0$ and $x_0$ may both correspond to $z_{0:0}$.

Figure 4:
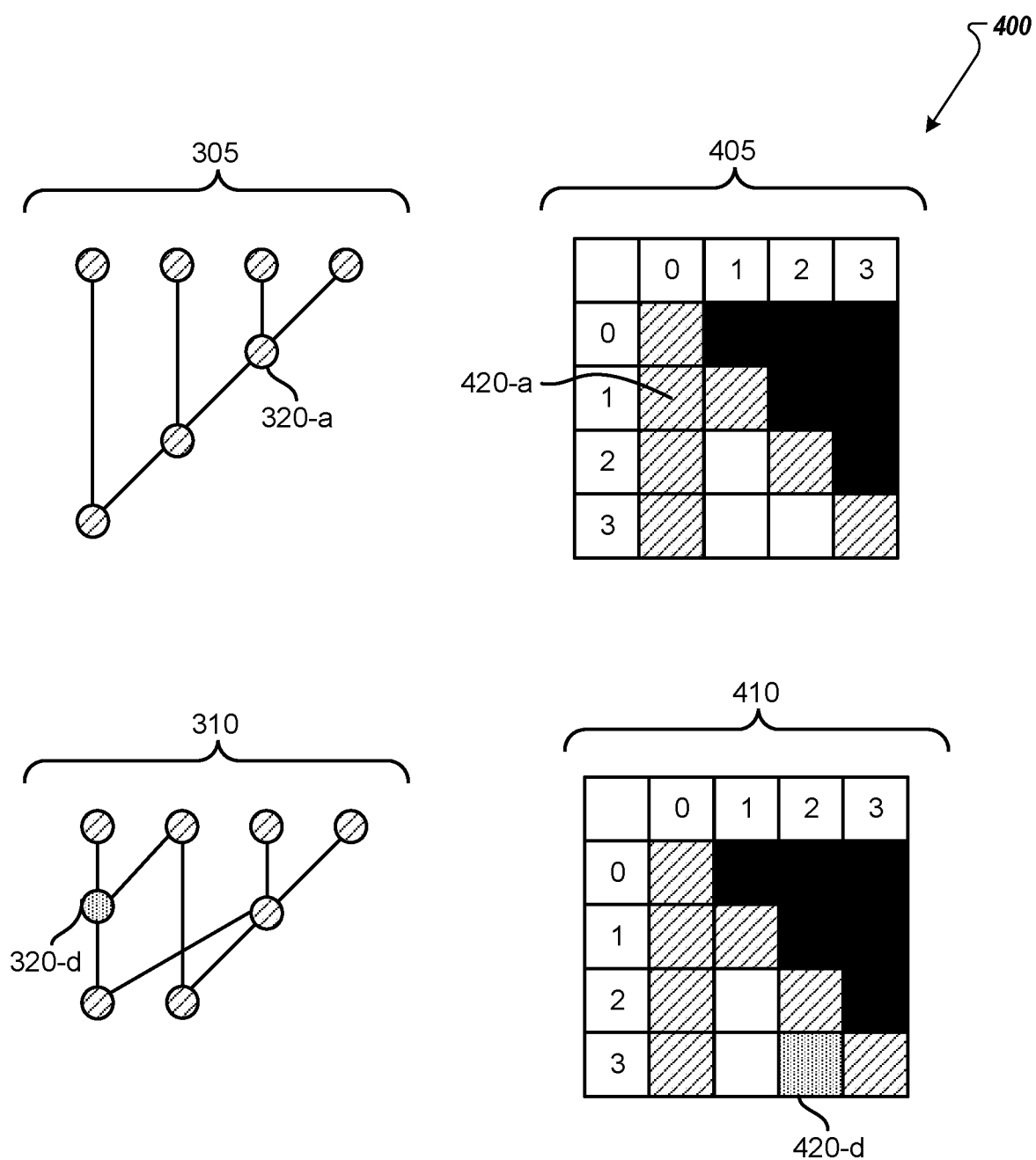
FIG. 4 illustrates example grid representations of parallel prefix graphs, in accordance with at least some embodiments.

Parallel prefix computations can be represented as a directed acyclic parallel prefix graph where every computation unit $z_{i:j}$ is a graph node that performs a single operation on two inputs: $z_{i:j} = z_{i:k} \circ z_{k-1:j}$. In embodiments, most and least significant bits (MSB, LSB) of computation node $z_{i:j}$ may be (i, j). Using this notation, the node (i, k) may be the upper parent of (i, j) and the node (k-1; j) may be the lower parent of (i, j). The prefix graphs corresponding to the 4-input prefix sum computations of the above example are shown in FIG. 4 as prefix graph 305 and prefix graph 310. In both graphs, the upper and lower parents of node (2, 0) are (2, 2) and (1, 0).

In at least one embodiment, every valid N-input prefix graph has input nodes (i, i), output nodes (i, 0) for $1 \leq i \leq N-1$, and the input/output node (0, 0). Furthermore, in at least one embodiment every non-input node has exactly one upper parent (up) and one lower parent (lp) such that:

LSB(node)=LSB(*lp*(node))

LSB(*lp*(node))≤MSB(*lp*(node))

MSB($lp$(node))=LSB($up$(node))−1

LSB($up$(node))≤MSB($up$(node))

MSB($up$(node))=MSB(node)

In an example, a data path circuit can receive inputs 315-*a* through 315-*d* and produce outputs 325-*a* through 325-*d*. In some examples, each input 315 and output 325 can represent signals received or produced by the data path circuit or wires coming to the data path circuit. In some examples, each input 315 can represent an element (or some data) the data path circuit is configured to synthesize. For example, in embodiments where the data path circuit is a binary adder, each input can represent a bits of the inputs with which the adder circuit performs a computational sum—e.g., the input 315-*a* can represent the zeroth bits or one's place and the input 315-*d* can represent the third bit or eight's place of numbers the adder circuit is to find the sum of. Accordingly, each output 325 can represent a value or bit generated by the data path circuit during its operation. In some embodiments, each output 325 can be generated from each previous input—e.g., output 325-*c* can be generated from input 315-*a* through 315-*c* while output 325-*d* can be generated from input 315-*a* through 315-*d*.

In some embodiments, each prefix graph can also include one or more nodes. For example, prefix graph 305 can include nodes 320-*a* through 320-*c*. In some embodiments, each node represents or is associated with one or more components of data path circuit that perform one or more operations. For example, node 320-*a* can represent one or more logic gates (e.g., AND gate, NOR gate, XOR gate, etc.) of the data path circuit 108. In some embodiments, the nodes 320 can also represent buffers or other types of gates.

In some embodiments, the area of a data path circuit can be related to the number of nodes 320 in the prefix graph representing the data path circuit—e.g., the greater the number of nodes 320, the greater the area associated with the data path circuit. For example, the area of a data path circuit represented by prefix graph 305 can be less than the area of a data path circuit represented by prefix graph 310—e.g., there are less nodes 320 in prefix graph 305. In some embodiments, the prefix graphs can also illustrate the delay associated with the data path circuit. For example, the delay of the data path circuit can be related to a longest path an input 315 takes to be generated as an output 325. For example, input 315-*a* goes through three nodes 320 before being utilized in the generating of output 325-*d* in prefix graph 305 while each input 315 of prefix graph 310 goes through no more than two nodes 320. In such embodiments, the delay of the data path circuit associated with prefix graph 310 can be less than the delay of the data path circuit 108 associated with prefix graph 305.

Referring to FIG. 2 and FIG. 3, in some examples, each design state 206 of the data path circuit can be represented by a unique prefix graph. In such embodiments, the agent 202 can receive a prefix graph that represents the current design state 206 of the data path circuit 108. In some embodiments, a grid representation of the prefix graph is received, as set forth in detail below and with reference to FIG. 4. In an example, if the prefix graph 305 represents an initial design state 206 of the data path circuit, the agent 202 can receive the prefix graph 305 (or a grid representation of the prefix graph) from the environment 204 before performing a modification thereto.

In some embodiments, the agent 202 can be configured to take an action 210 that modifies a node 320 of a prefix graph representing the current design state 206 of the data path circuit. In at least one embodiment, the agent 202 can add or remove a node 320 from the prefix graph representing the current design state 206 of the data path circuit. For example, the agent 202 can add a node 320-*d* to the prefix graph 305. In some embodiments, the machine learning model 240 can determine which node 320 to remove or determine where to add a node 320 to the prefix graph. In some embodiments, the machine learning model 240 receives an input grid representation of a prefix graph and outputs a grid representation of a modified prefix graph in which a node has been added or removed.

In some embodiments, agent 202 includes a graph validity determiner 244. Alternatively, graph validity determiner 244 may be included in environment 204. Graph validity determiner 244 may assess the validity of an updated prefix graph (e.g., that is output by machine learning model 240). If an updated prefix graph is invalid, then graph validity determiner 244 performs one or more further modifications to the prefix graph to cause it to be valid. Such modifications may be the addition or removal of one or more nodes to/from the prefix graph. In some embodiments, if the graph validity determiner 244 determines the action 210 results in an invalid state (e.g., invalid prefix graph), the graph validity determiner 244 can modify the design state 206 again. That is, the graph validity determiner 244 can validate the updated state following the action. In some embodiments, the graph validity determiner 244 can validate the state by adding or removing invalid nodes and/or making sure each node follows the rules as specified below.

In embodiments, a valid N-input prefix graph has input nodes (i, i), output nodes (1,0) for 1≤i≤N−1, and the input/output node (0,0) as described above. For example, in prefix graph 310, input nodes (1,1) to (3,3) correspondent to inputs 315-*b* to 315-*d* at index one (1) to three (3); output nodes (1,0) to (3,0) correspond to nodes 320-*a* to 320-*c* that feed outputs 325-*b* to 325-*d* at index one (1) to three (3); input/output node (0,0) correspond to input 315-*a* at index zero (0) that also feeds output 325-*a* at index zero (0).

In some embodiments, a valid prefix graph can be one where each non-input node (e.g., each node that is not (0,0), (1,1,), (2,2), etc.) has exactly two parents, an upper and a lower parent, that it directly receives values from. These parents may be another non-input node 320 or an input 315. That is, a prefix graph where a non-input node 320 has one parent or more than two parents is invalid. In some embodiments, the valid prefix graph also has each node 320 having a sequential contiguous range of input indices it directly or indirectly receives values from. For example, node 320-*b* is a valid node with a range (2,0) as is receives values from inputs at index zero (0), one (1) and two (2). In the (MSB, LSB) notation for the node, The most-significant bit (MSB) represents the upper end or first element of the node's range and the least-significant bit (LSB) represents the lower end or second element of the node's range. A node 320 with range (0,2) would be invalid as the range increases from the MSB to the LSB. In some embodiments, a prefix graph with a node 320 having a range (6,3) but not receiving a value from input at index five (5) is invalid—e.g., the range is not contiguous as the node 320 receives inputs at index three (3), four (4), and six (6) but not five (5).

Additionally, each non-input node can directly receive values from exactly one upper parent and one lower parent that are contiguous. For example, if a node 320 has a range (3,1), and has an upper parent having a range (3,3), then the node 320 must also have a lower parent having a range (2,1). That is, node 320's upper parent's range must have the MSB as node 320's range (e.g., 3) and node 320's lower parent's range must have the same LSB as node 320's range (e.g., 1) while also being contiguous—e.g., including the input at index 2. Accordingly, the prefix graph can follow the rules above regarding the upper and lower parents.

In embodiments, the action space A for an N-input prefix graph consists of two actions (add or delete) for any non-input/output node—e.g., where $LSB \in [1, N-2]$ and $MSB \in [LSB+1, N-1]$. Hence, $|A|=(N-1) \times (N-2)/2$. The environment evolution through T may maintain valid prefix graphs by: 1) applying a validation procedure (e.g., performed by graph validity determiner 244) after an action that may add or delete additional nodes to maintain validity; and 2) forbidding redundant actions that would become undone by the validation procedure.

In one embodiment, during validation, the upper parent of a node, up(node), is the existing node with same MSB and the next highest LSB. In one embodiment, the lower parent of a node, lp(node) is computed using the node and its upper parent according to:

$$(MSB_{lp(node)}, LSB_{lp(node)}) = (LSB_{up(node)} - 1, LSB_{node})$$

In one embodiment, an invalid condition happens when the lower parent of a node does not exist. In such a condition, graph validity determiner 244 performs the validation procedure to add any missing lower parent nodes.

In one embodiment, system 200 (e.g., environment 204 or agent 202) maintains a list of all nodes nodelist in a valid prefix graph. In one embodiment, the action of adding a node that already exists in nodelist is redundant and is forbidden. In one embodiment, system 200 (e.g., environment 204 or agent 202) maintains a minimal list minlist of nodes from nodelist that are not lower parents of other nodes. In one embodiment, the action of deleting a node is limited to those in minlist, otherwise a node may be deleted that either does not exist, or that is the lower parent of another node. For such modifications, the deleted node may be added back during validation.

Environment 204 receives action 210 (e.g., a prefix graph update) and determines a next design state 212 and a reward 214 associated with the action 210 on current design state 206. The environment 204 may start with an initial state $S_0$, which may be randomly chosen in some embodiments. In some examples, the environment 204 can execute on one or more processing device, such as a CPU or GPU. In some embodiments, the system 200 can include multiple environments 204, each of which may receive a different action (e.g., a different modified state of the data path circuit). In an example, multiple environments 204 may concurrently receive modified states of the data path circuit as output by different agents 202 to decrease an amount of time to find a target data path circuit design. In at least one embodiment, the environment 204 can update or modify the design state 206 based on the action 210 chosen by the machine learning model 240. In one embodiment, the environment 204 can generate a prefix graph for the state 212 after the action 210—e.g., the environment can generate a prefix graph 310 when the action 210 specifies to add a node 320 with a value (3,2) to the prefix graph 305. In some embodiments, the agent 202 can receive the prefix graph associated with the modified state—e.g., the agent 202 can receive the prefix graph 310 or a grid representation of the prefix graph.

For every action 210 (e.g., for every design state of a data path circuit), a prefix graph assessor 242 of the environment 204 may estimate one or more parameters of the data path circuit. Such estimated parameters may include an area of the data path circuit, power consumption of the data path circuit, and/or delay of the data path circuit, for example.

The prefix graph assessor 242 may then compare the determined parameters to one or more goals and/or constraints for the data path circuit. Additionally, the prefix graph assessor 242 may estimate (or may have previously estimated) similar parameters for a previous state of the data path circuit (e.g., design state 206). Prefix graph assessor 242 may additionally compare the parameters of for the previous state of the data path circuit to the constraints and/or goals. Prefix graph assessor 242 may compare the parameters and/or a distance between the parameters and the goals of the initial design state 206 to the parameters and/or distance between the parameters and the goals of the updated design state 212. Based on such comparison, prefix graph assessor 242 may output a reward 214. For example, if the parameters associated with the updated design state are closer to the goal than the parameters associated with the previous design state, then a positive reward 214 may be output. On the other hand, if the parameters associated with the updated design state are further from the goal than the parameters associated with the previous design state, then a negative reward 214 may be output. Environment 204 may also output a next design state 212 to be input into the agent 202.

If the environment 204 determines the next design state 212 following the action 210 to modify the current design state 206 is valid or has validated the modified design state, the environment can calculate a next reward 214. In some embodiments, the reward 214 predicts the net change in area, power consumption and/or delay of the data path circuit 108 as a result of the action 210. That is, the environment 204 can calculate the delay, area, and power for the initial state (or current design state 206) and the delay, area, and power for the next design state 212 and determine a difference between the two to calculate the next reward 214. In one embodiment, the environment 204 can determine the reward as described with reference to FIG. 8. In some embodiments, the environment 204 can determine the reward via a second machine learning model as described with reference to FIG. 7. That is, the environment 204 can include a second machine learning model that predicts the change in area, delay, and power of the data path circuit following the action 210. In some examples, the environment 204 can determine the reward 208 (or next reward 214) as described with reference to FIG. 5.

For example, the environment 204 can determine an area, delay, and/or power consumed by a data path circuit 108 having a design represented by prefix graph 305. In some examples, the prefix graph assessor 242 of the environment 204 can utilize a synthesis tool 505 that computes the area, delay, and/or power of a physical data path circuit given a prefix graph (e.g., prefix graph 305). In some examples, the synthesis tool 505 can determine types of logic gates to use, determine sizes of a logic gates to use, determine the connectivity of logic gates, determine if buffers or other components will optimize the prefix graph, and so on. In some examples, generating a potential physical data path circuit from the prefix graph via the synthesis tool 505 can increase or decrease the area, delay, or power consumption of the data path circuit. That is, generating the potential physical data path circuit can cause changes and modifications to the specific circuit implementation from the prefix graph due to physical and manufacturing constraints. For example, if a node of a prefix graph was an input to four other nodes (e.g., four other nodes receive value from the node), the synthesis tool 505 could insert a buffer when generating the potential physical data path circuit, causing an increase in area.

In some embodiments, the prefix graph assessor 242 of environment 204 can also determine the area, delay, and/or power consumed by a data path circuit having a design represented by prefix graph (e.g., prefix graph 310) that is output by agent 202 (e.g., that is the result of the modification and validation of an input prefix graph). To determine the area, delay, and/or power of the data path circuit, the environment can use the synthesis tool 505 to generate a predicted physical data path circuit from the prefix graph. For each calculation (e.g., for calculation of the initial prefix circuit such as prefix circuit 305 and calculation of the modified or updated prefix circuit such as prefix circuit 310), the prefix graph assessor 242 can determine an area/delay curve for a graph 510. That is, the environment 204 can determine a curve 515 that represents the delay of a data path circuit associated with the initial prefix graph (e.g., prefix graph 305) for respective areas. Similarly, the environment 204 can determine a curve 520 that represents the delay of a data path circuit associated with an updated prefix graph (e.g., prefix graph 310) for respective areas.

Figure 5:
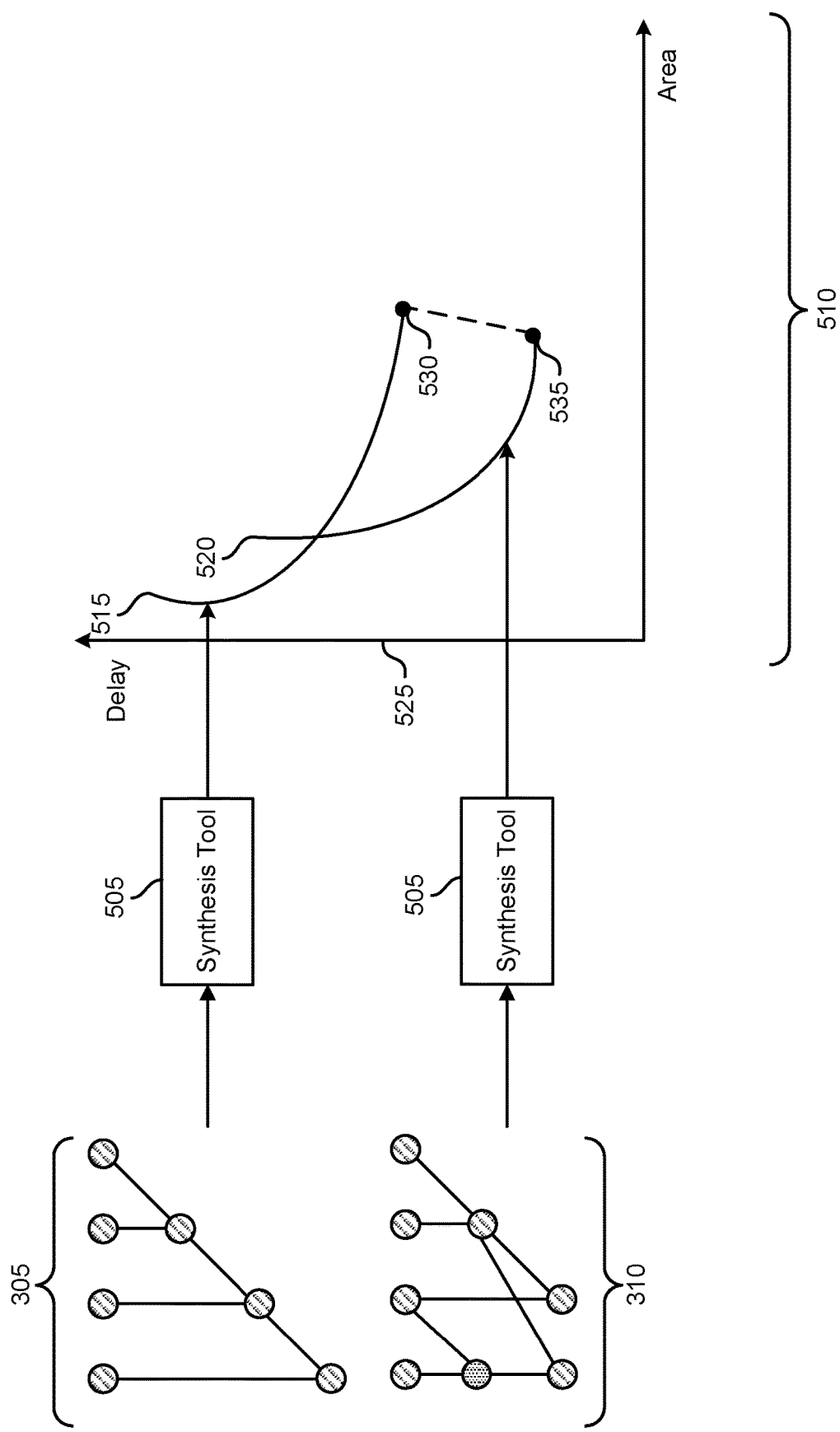
FIG. 5 illustrates an example data path circuit design calculation, in accordance with at least some embodiments.

In some embodiments, the environment can calculate the reward of the action 210 by determining a difference in the delay and area based on the weight constraint described with reference to FIG. 6. For example, if the weight is one (1), the reward can be calculated by taking a difference between points 530 and 535—e.g., based on the weight curve described with reference to FIG. 6. In this embodiment, the modification from prefix graph 305 to prefix graph 310 via the action 210 reduced the area and the delay. Accordingly, the environment 204 can calculate a next reward 214 that indicates the amount of area reduced and the amount of delay reduced via the action 210. In other embodiments, the environment 204 can calculate a next reward 214 that indicates the area increased, the area decreased, the delay increased, the delay decreased, or a combination thereof. Although area vs delay is shown in FIG. 5, the environment 204 can determine the difference in area, power, delay, or any combination thereof when calculating the next reward 214. In some embodiments, the environment 204 can send the next reward to the agent 202—e.g., to the machine learning model 240.

The agent 202 can be configured to receive the next reward 214. In some embodiments, the agent 202 can determine whether the action 210 taken optimized the data path circuit—e.g., whether the action 210 caused a reduction in area, power, and/or delay of the data path circuit. In some embodiments, the agent 202 can use reinforcement learning to train the machine learning model 240. That is, the agent 202 can train the machine learning model 240 based on the next rewards 214 received. In one embodiment, agent 202 trains the machine learning model(s) 240 based on the reward 214 and the previously output action 210. Training can be performed by defining an error (e.g., based on the action and reward), and using techniques such as stochastic gradient descent and backpropagation to tune the weights of the network across all its layers and nodes such that the error is minimized.

In an example, if the next reward 214 indicates a reduction in area, power, or delay, the machine learning model 240 can continue taking actions 210 similar to those that resulted in the reduction. If the next reward 214 indicates an increase in area, power or delay, the machine learning model 240 can be trained to take other actions 210 by adjusting the weights of nodes in the machine learning model. In some embodiments, the machine learning model 240 can be trained using model (based/free), value/policy based, or on/off policy reinforcement learning techniques.

As discussed above, in embodiments where the machine learning model 240 is used as a component of a deep Q-network, the machine learning model 240 may receive an input of the design state 206 predict an area and delay reduction for an action 210. For example, the machine learning model 240 may receive state $s_t$ 206 as input and predict:

$$\forall a \in A : [Q_{area}(s_t, a), Q_{delay}(s_t, a)].$$

The input to the machine learning model can be a N×N×4 tensor where the four channels encode node features as:
1) 1 if node (MSB, LSB) in nodelist, 0 otherwise;
2) 1 if node (MSB, LSB) in minlist, 0 otherwise;
3) Level of node (MSB, LSB) in nodelist, 0 otherwise;
4) Fanout of node (MSB, LSB) in nodelist, 0 otherwise where the nodelist is all nodes 320 in a valid prefix graph, minlist is all nodes 320 in the nodelist that are not lower parents of other nodes, level of node is topological depth from input nodes in the prefix graph (e.g., the number of nodes 320 between it and a respective input 315) and fanout of a node refers to the number of nodes 320 that depend from it. Over time, the machine learning model 240 via reinforcement learning techniques is trained to take actions 210 that most optimize the design of the data path circuit 108—e.g., reduce the area, power and/or delay of the data path circuit 108.

In some embodiments, the agent 202 can be configured to separately train different instances of the machine learning model 240 for each unique circuit that the agent 202 is to optimize. For example, the agent 202 can train the machine learning model 240 for a 32 bit adder circuit and separately train another instance of the machine learning model 240 for a 64 bit adder circuit. In some embodiments, different instances of the machine learning model 240 can be trained for each respective property—e.g., trained for each target delay time of the data path circuit to reduce the area as much as possible. By utilizing reinforcement learning with the machine learning model, the design of the data path circuit can be more optimized than compared with other solutions—e.g., the delay, area, and/or power of the data path circuit can be reduced. Accordingly, the overall performance of any system (e.g., a memory system) that incorporates the data path circuit can increase as the data path circuits consume less power, have less delay, and take up less area in the memory system.

In some examples, the agent 202 and/or environment 204 can use reinforcement learning to train the machine learning model 240 to take actions 210 that optimize the area, delay, and/or power of the data path circuit 108 as described herein. In some embodiments, the machine learning model 240 can determine whether to add or remove a node 320 based on programmed constraints or values. For example, the machine learning model 240 can be constrained by a maximum circuit width, a maximum arrival time of data path circuit, a weight between area and delay (or area and power, power and delay, power and area, or any combination thereof), technology library, synthesis tool, circuit generator options, and/or other target parameters for data path circuit. Such constraints may be provided by environment 204 and used to determine reward 214 in embodiments.

In an example, the machine learning model 240 can be trained not to add or remove nodes that cause the delay of the data path circuit to not exceed a maximum circuit delay. In some embodiments, the machine learning model 240 can be constrained by an arrival time of the inputs 315 of the data path circuit—e.g., some delay associated with receiving the inputs 315 rather than a delay associated with the data path circuit itself. In some embodiments the machine learning model 240 can be constrained by a target parameter. For example, the machine learning model 240 can be trained to modify (e.g., design) the data path circuit until it reaches a given area, power consumption and/or delay. In another example, the machine learning model 240 can be trained to modify (e.g., design) the data path circuit to optimize for weighted balance between improvements in area, power consumption, and delay objectives using weight parameters. In other embodiments, the machine learning model 240 can be trained to modify the data path circuit for a given area, a given power consumption, and/or a given delay.

In some embodiments, the machine learning model 240 can be constrained by circuit generator options. That is, there can be different ways to generate a data path circuit for same parallel prefix graphs—e.g., the predicted physical implementation of the data path circuit can change based on which options are selected to predict the physical implementation. For example, for an adder data path circuit, the prefix adder circuit generally performs the function:

$$O(n+1)=A(n)+B(n)+C(1)$$

Where "O" is the output having length n+1 bits, "A" and "B" are binary inputs having length "n" bits, and "C" is an input having a length one (1) bit. In some embodiments, the circuit generator can different options that cause different functions and results. For example, the following functions are possible:

1) Not having a carry-in (e.g., no "C" value): $O(n+1)=A(n)+B(n)$;
2) Not having a carry-out: $O(n)=A(n)+B(n)+C(1)$;
3) Not having a carry-in or carry out: $O(n)=A(n)+B(n)$;
4) When one or more bits of the inputs "A/B/C" are fixed at values one (1) and zero(0);

In some embodiments, the system 200 can select between any of the options listed above. In such examples, the agent 202 or environment 204 can generate different types of circuits from a same parallel prefix graph based on which option is selected—e.g., the same prefix graph can result in a different area, delay, power consumption, or any combination thereof based on the selected settings for the circuit generator. Accordingly, the agent 202 is trained based on the specific settings and options selected for the data path circuit. In some embodiments, the prefix adder generation can also be affected by a choice of recurrence (e.g., Weinberger or Ling) or a choice of bitwise carry propagation logic (XOR or OR). In some embodiments, the various options for the circuit generator listed above can apply to adder circuits—e.g., not to other data path circuits such as priority encoder circuits.

In some embodiments, the system 200 can choose to include connected logic in the data path circuit 108. For example, the environment 204 can use a circuit generator that generates a prefix circuit corresponding to a prefix graph along with additional circuit logic connected to the inputs and/or outputs of the prefix circuit. In such an example, the agent 202 is trained based on the specific additional circuit logic that is connected to the prefix circuit. In such an example, the prefix graph assessor 242 may assess the area, power consumption and/or delay of the prefix circuit and the additional circuit logic combined.

In other embodiments, the machine learning model 240 can be constrained by a weighted balance between optimizing area, power consumption and/or delay. For example, prefix graph assessor may use a weighted balance between estimated area, power consumption and/or delay when computing a reward 214. That is, as described above, modifying a data path circuit to reduce an area, or power, or delay associated with the data path circuit can cause a different property of the data path circuit to increase—e.g., reducing delay can cause the area of the data path circuit to increase. For example, modifying the prefix graph 305 to generate prefix graph 310 can cause the delay of the data path circuit to decrease but the area of the data path circuit to increase. Accordingly, the machine learning model 240 can be trained to optimize the data path circuit according to respective weights assigned to delay and area.

Figure 6:
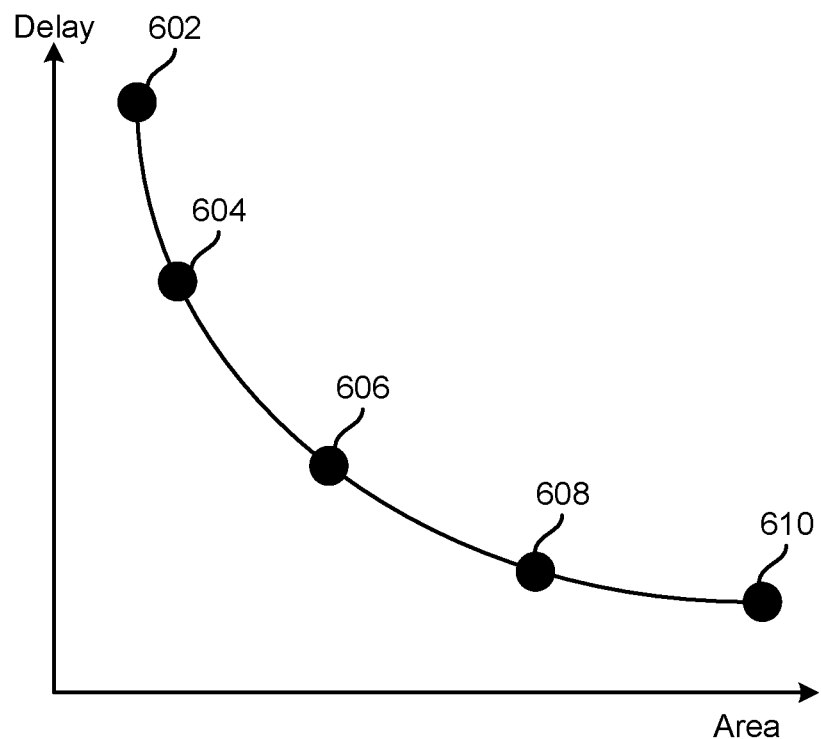
FIG. 6 illustrates an example constraint for data path circuit design, in accordance with at least some embodiments.

In an example, FIG. 6 illustrates possible weighted values on a curve between delay and area for a data path circuit. In some embodiments, a weighted value 610 represents a weight value of one (1). In such embodiments, rewards can be determined that cause the machine learning model 240 to seek to optimize (minimize) just the delay—e.g., the reinforcement learning trains the machine learning model 240 to take actions 210 that reduce the delay without regard to the resultant decrease or increase in the area of the data path circuit. In some embodiments, a weighted value 602 represents a weight value of zero (0). In such embodiments, the machine learning model 240 be trained to optimize (minimize) just the area of the data path circuit—e.g., the reinforcement learning trains the machine learning model 240 to take actions that 210 that reduce the area without regard to the resultant increase or decrease in the delay of the data path circuit. Weighted value 608 can represent optimizing more for delay than for area while weighted value 604 can represent optimizing more for area than for delay. In some embodiments, weighted value 606 can represent optimizing for delay and area equally.

In some embodiments, the machine learning model 240 and/or environment 204 can use the following formula to determine how much to optimize between delay and area:

$$\begin{bmatrix} Q \text{ area } (s_{t+1}, a) \\ Q \text{ delay } (s_{t+1}, a) \end{bmatrix} \times \begin{bmatrix} w \\ 1-w \end{bmatrix}$$

wherein Qarea is associated with optimizing the area of the data path circuit, Qdelay is associated with optimizing the delay of the data path circuit, $s_{t+1}$ indicates the next design state 212, "a" indicates the action taken (e.g., which node 320 was added or removed from the prefix graphs) and "w" represents a predetermined weight. In such embodiments, the weight "w" can have a value between zero (0) and one (1). By utilizing the weighted balance, the machine learning model 240 can be trained to optimize for delay, or area, or power, or any combination thereof. That is, the environment can be updated 204 to train the machine learning model 240 to modify the design for a data path circuit such that the delay for the data path circuit is the same while the area is reduced or vice versa. Although FIG. 6 illustrates the balance between optimizing delay and area, a weighted balance between area and power or delay and power is also possible. In some embodiments, the weighted balance between area, delay, and power is also possible—e.g., the graph 600 can be a three-dimensional graph that represents how much the machine learning model 240 and/or environment 204 should weigh optimizing between power, delay, and area.

In some embodiments, a grid representation is used to represent a prefix graph, as shown in FIG. 4. Use of the grid representation of the prefix graph enables the prefix graph to be processed by machine learning models. The grid representation is a concise representation of prefix graphs in a grid (e.g., in a two-dimensional grid). Each row and each column of the grid representation of a prefix graph may be associated with a different input of the prefix graph, and each intersection of a row and column may be associated with a node of the prefix graph. In one embodiment, the state space S of the system 200 consists of all valid N-input prefix graphs. N-input graphs can be represented in a N×N grid with rows representing MSB and columns representing LSB. Note that in embodiments the input nodes (MSB=LSB) lie on the diagonal, output nodes will lie on the first column (LSB=0) and locations above the diagonal (LSB>MSB) cannot contain a node. In embodiments, the remaining (N−1)(N−2)/2 locations where non-input/output nodes may or may not exist define the $O(2^{(N-1)(N-2)/2})=O(2^{N^2})$ state space of N-input prefix graphs. For example, 32-input graphs may have a sate space of $|S|=O(2^{465})$, where the exact value is lower due to some of the possible combinations of nodes not being valid.

With reference to FIGS. 3-4, each value of the grid can represent an input 315 (e.g., an input node) or a potential node 320 on the prefix graph 305. In such embodiments, each node 320 can have a range (e.g., position) on the grid 405 that corresponds to its location on the prefix graph 305. Each range can include a row index as its first element and a column index as its second element. For example, node 320-a can be represented by the range 420-a (1,0)—e.g., the node 320-a receives a first input (e.g., 1 or 315-b) and a second input (e.g., 0 or 315-a).

As described with reference to FIG. 3, each output 325 of the prefix graph receives values from directly or indirectly every previous input 315. A valid prefix graph will have nodes 320 that are associated with contiguous ranges—e.g., (2,0) or (3,1) where the node 320 receives inputs at index 0-2 or 1-3 respectively. In such embodiments, ranges where the first element is less than the second element are not possible—e.g., (0,3) is not a possible range for a node.

In some embodiments, the machine learning model 240 can receive a grid representation of an initial state of a data path circuit, and may select a node 320 for addition or removal from a prefix graph. The machine learning model 240 may then output a grid representation of nodes for addition or removal. For example, a machine learning model 240 for a Q network may populate the output grid representation with Q values at every node position. The Q value at any position will correspond to the Q value for the addition action (if the node does not exist) or removal action (if the node exists) action for a node 320 corresponding to that position. In some embodiments, the machine learning model 240 may output multiple grids representations of the same dimensions. For example, if the machine learning model 240 is a Q network that is optimizing for area and delay of a data path circuit 108, it may output a grid representation for $Q_{area}$ and a grid representation for $Q_{delay}$. In such an example, the action with the highest weighted Q value will be chosen to add or remove a node 320 from the prefix graph.

In some embodiments, the machine learning model 240 can receive the grid representation of the current design state 206. For example, the machine learning model 240 can receive the generated grid 405 when the current design state 206 is represented by prefix graph 305. In some embodiments, the machine learning model 240 can modify the prefix graph 305 by selecting a node to add or remove from the grid 405. In one embodiment, the machine learning model 240 can select to add a node 420-d (e.g., (3,2)) to grid 405 to generate a grid 410. In at least some embodiments, the grid 410 can represent a modification to the prefix graph 305. For example, by adding the range 420-d to the grid for the prefix graph, the prefix graph 305 can be modified to generate a grid for prefix graph 310 with an additional node 320-d.

In embodiments, the agent 202 (e.g., the machine learning model 240 of the agent 202) can output the action. The output action may be an action to update the prefix graph (e.g., a new node to add or an existing node to delete). In an example, a grid representation in which a node to be added at (3,2) is output. The environment 204 receives the output action 210 (e.g., the addition action along with the node location (3,2) in the grid representation). The environment may be configured to operate on prefix graphs, on grid representations of prefix graphs, or on other representations of prefix graphs. In some embodiments, the environment 204 receives a node location on the grid representation of a prefix graph (e.g., (3,2)) and generates the prefix graph 310 after updating to the grid (e.g., grid 410) from the grid of the previous state (e.g., grid 405).

As described elsewhere in the present disclosure, the machine learning model 240 can be trained using reinforcement learning so that the action 210 taken optimizes the data path circuit for area, power consumption and/or delay. That is, the machine learning model 240 can be trained so that it, for example, determines to add node 320-d having a range (3,2) to optimize one or more property associated with the data path circuit—e.g., so it reduces the delay, area, power, and/or any combination thereof according to a weighted constraint. As described elsewhere, in some embodiments the certain parameters in the reinforcement learning algorithm such as the discount factor can be configured to train the machine learning model 240 be trained to choose a sequence of actions over time optimize one or more property associated with the data path circuit 108.

Figure 7:
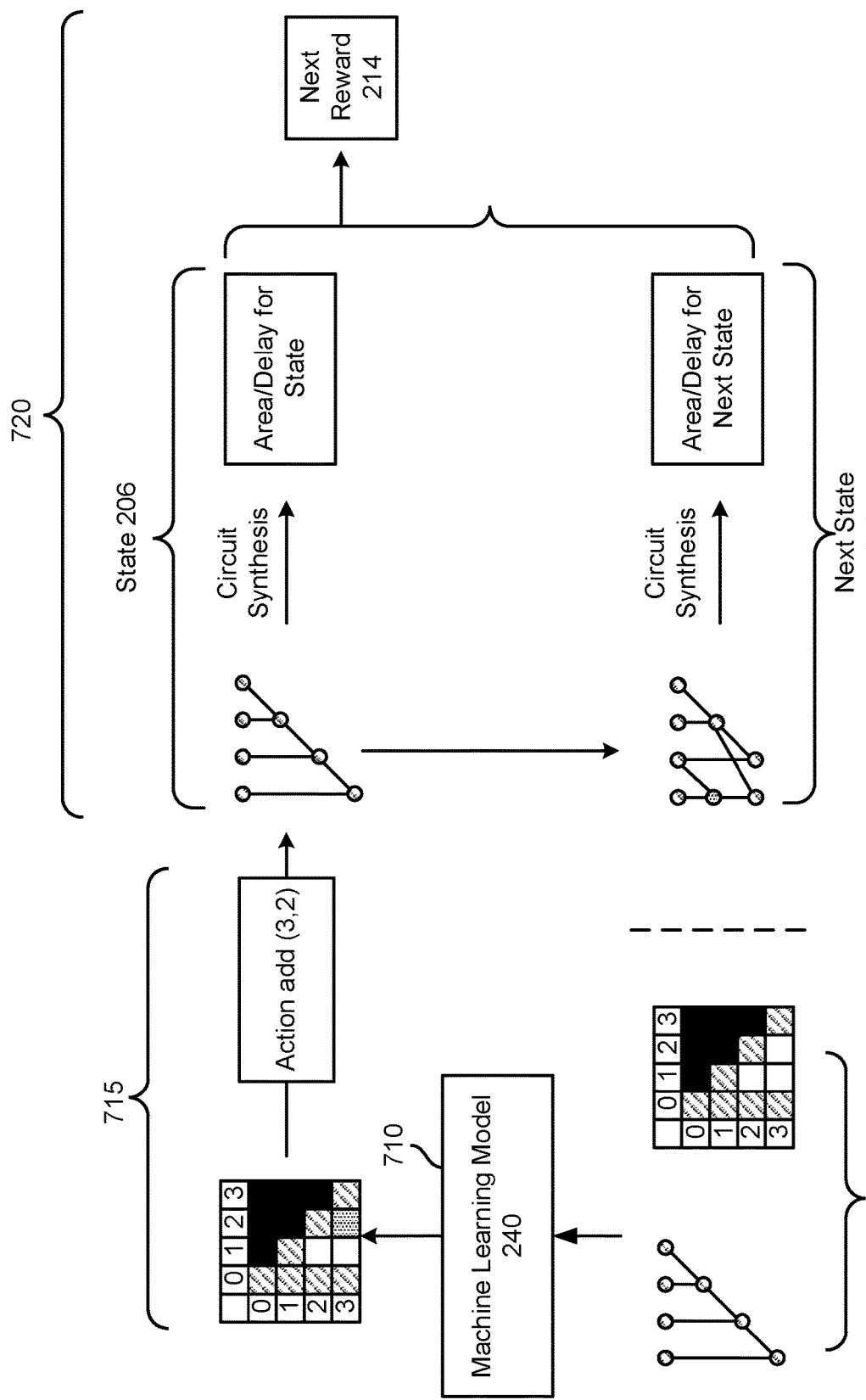
FIG. 7 illustrates a diagram of an example method for data path circuit design with reinforcement learning, in accordance with at least some embodiments.

FIG. 7 illustrates an example diagram 700 of data path circuit design using reinforcement and machine learning, in accordance with at least one embodiment. The reinforcement learning shown in diagram 700 can be performed by processing logic comprising hardware, software, firmware, or any combination thereof. In at least one embodiment, operations shown in diagram 700 include operations performed by agent 202, machine learning model 240, and/or environment 204 as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 705, an agent 202 can receive a current design state 206 of a data path circuit. In some examples, the agent 202 can receive a prefix graph corresponding to the current design state 206 of the data path circuit. In at least one embodiment, the agent 202 can receive or generate a grid representation of the prefix graph as described with reference to FIG. 4. In some embodiments, the agent 202 can send the grid representation of the current design state 206 to the machine learning model 240. In some embodiments, the agent 202 can also receive a reward (e.g., reward 208 as described with reference to FIG. 2). In such embodiments, the agent 202 can train the machine learning model 240 with reinforcement techniques based on the received reward. For example, if the reward indicates the previous action taken by the machine learning model 240 resulted in a reduction of an area, delay, or power associated with the data path circuit, the agent can train the machine learning model 240 to continue taking similar actions.

At operation 710, the machine learning model 240 can receive the grid representation of the parallel prefix circuit. In some embodiments, the machine learning model 240 can select an action to modify the grid representation of the prefix graph. In some embodiments, the machine learning model 240 can select an action that adds or removes a node from the prefix graph—e.g., the machine learning model can select a range on the grid representation that corresponds to adding or removing a node on the prefix graph as described with reference to FIG. 2 and FIG. 4.

At operation 715, the agent 202 can transmit the action (e.g., adding a node at (3,2)) to the environment 204.

At operation 720, the environment 204 can calculate a next reward 214 based on the modification to the grid representation of the prefix graph—e.g., the environment 204 can modify the grid representation based on the action received from the agent 202 and then modify the prefix graph accordingly. In some embodiments, the environment 204 can first determine if the received action causes the design state 206 to be valid or invalid as described with reference to FIG. 2. In some embodiments, if the environment 204 determines the action causes the state to be invalid, the environment 204 can validate the state by adding or removing invalid nodes to/from the prefix graph. In some embodiments, the environment 204 can generate a prefix graph representing the next design state 212 after determining the modified state after applying action received from the agent 202 is valid or after validating the modified state after applying the action received from the agent 202. In some embodiments, the environment 204 can calculate the area, delay, and/or power for the current design state 206 and the modified next design state 212 after generating the prefix graph representing the next design state 212. In one embodiment, the environment 204 can calculate the next reward 214 by performing circuit synthesis on each of the design state 206 and the next design state 212. In such embodiments, the environment 204 can determine the area, delay, and/or power for the design state 206 and for the next design state 212 and determine a difference between the two to determine the next reward 214 as described with reference to FIG. 5.

In some embodiments, the environment 204 can include a metrics predictor model (e.g., a second machine learning model or second model) to calculate the next reward 214. In such embodiments, the metrics predictor model can be trained to predict the delay, area, and/or power for each state of the data path circuit—e.g., for the design state 206 and for the next design state 212. For example, initially, the environment 204 can determine the area, power, and/or delay of the modified data path circuit by using the circuit synthesis. A database can store each state generated by the environment, and the area, power, and/or delay metrics associated with a respective state. For example, the database can store the design state 206, the next design state 212, and the area, power, and/or delay for the design state 206 and the next design state 212. The metrics predictor model can process the data stored at the database and be trained to predict an area, power, and delay for a respective state. That is, the metrics predictor model can be trained to receive a state as an input and predict the area, delay, and/or power associated with the state based on processing the data stored at the database—e.g., based on processing previous states and their respective delay, area, and power. The metrics predictor model may be trained to receive a grid representation of a prefix graph as an input in embodiments. Accordingly, when the metrics predictor model is trained, the environment can send the prefix graph (or the grid representation) associated with a given state to the metrics predictor model. In such embodiments, the metrics predictor model can predict the delay, area, and/or power for the respective state. To calculate the reward, the environment 204 can find the difference between the predicted delay, area, and/or powers output by the metrics predictor model. For example, the environment 204 can provide the design state 206 and the next design state 212 to the metrics predictor model. In such embodiments, the metrics predictor model can predict the delay, area, and/or power for the design state 206 and for the next design state 212. The environment 204 can then find the difference between the delay, area, and/or power for the next design state 212 and the delay, area, and/or power of the design state 206 to determine the next reward 214. In some embodiments, the environment 204 can then send the reward 214 back to the agent 202. In such embodiments, the agent 202 can utilize the next reward 214 to train the machine learning model 240 via the reinforcement learning techniques as described herein. In some embodiments, using machine learning for predicting the area, delay, and power can take less resources and consume less time than performing a circuit synthesis.

Figure 8:
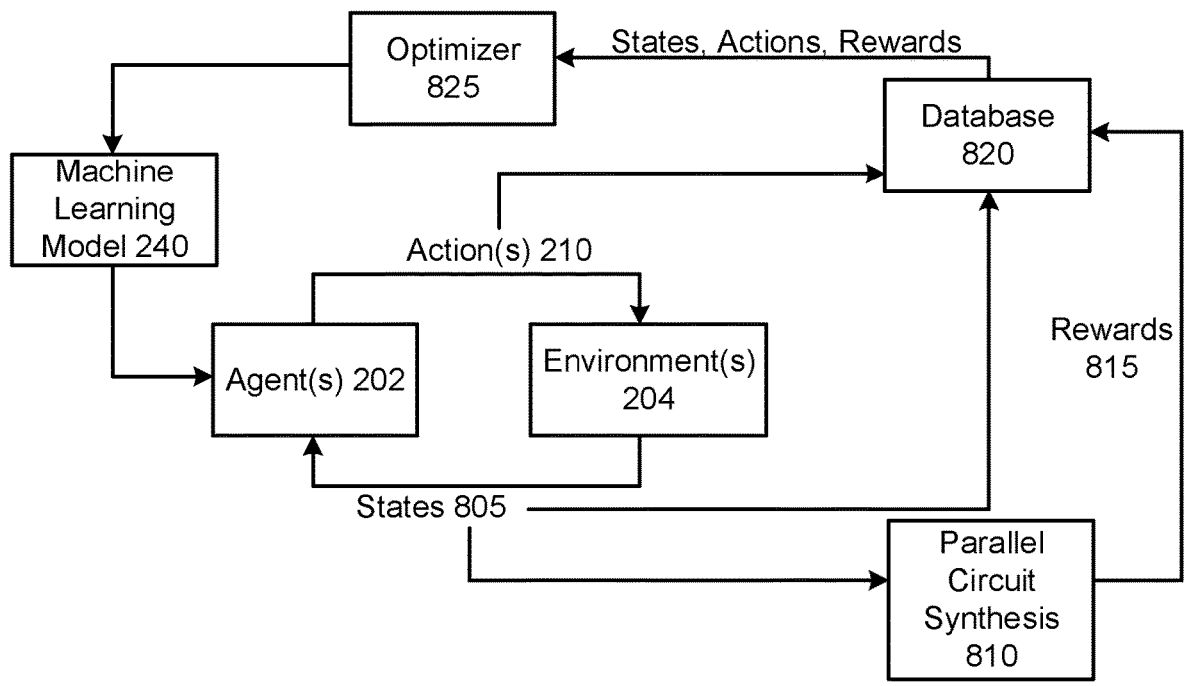
FIG. 8 illustrates an example system architecture, in accordance with at least some embodiments.

FIG. 8 illustrates an example system 800 that performs reinforcement learning using a machine learning model 240, according to at least one embodiment. In some embodiments, system 800 can include an agent (e.g., an actor, a circuit modifier, etc.) 202 and an environment (e.g., a simulation environment, a circuit synthesizer, etc.) 204 as described with reference to FIG. 2. In some embodiments, the system 800 can include a parallel circuit synthesis 810, a database 810, and an optimizer 825. In some embodiments, the agent 202 can include the machine learning model 240 as described with reference to FIG. 2. In some examples, the optimizer 825 can be include in the agent 202. In at least one embodiment, system 200 can be utilized to design a data path circuit 108 as described with reference to FIG. 1

As described with reference to FIG. 2, an agent 202 can be configured to select an action to modify a state of a data path circuit. In some embodiments, the environment 204 can be configured to apply the modification, validate the modified state if needed and return a next state (e.g., a new state 805) to the agent 202. In some examples, the environment 204 can also convert the state generated after applying action 210 taken by the agent 202 into a prefix graph—e.g., convert the grid generated by the applying the action from agent 202 into a prefix graph as described with reference to FIG. 4. In some embodiments, the system 800 can continue this process until a design of the data path circuit is optimized as described with reference to FIG. 2. In some embodiments, the system 800 can include multiple agents 202 and multiple environments 204 to perform the process.

In at least one embodiment, system 800 can calculate the reward for a transition from an initial state 805 to a new state 805 separately from applying the action 805 from the agent 202. That is, system 800 illustrates an alternative method to utilize reinforcement learning to design a data path circuit 108 as compared with the method illustrated in FIG. 2 and FIG. 7.

For example, in one embodiment, the agent 202 can send the action taken (e.g., adding or removing a node) to both the environment 204 and to a database 820. Similarly, environment 204 can send a current state to the agent 202 as well to the database 820 and to a parallel circuit synthesis 810. In such embodiments, the environment 204 and agent 202 can cycle through actions and states without waiting on a circuit synthesis 810 to convert the prefix graph to a predicted physical data path circuit to determine the reward—e.g., the agent 202 and environment 204 can cycle through states and actions in a shorter duration.

In some embodiments, parallel circuit synthesis 810 can include one or more CPUs that synthesize the prefix graph into a predicted physical data path circuit. In such embodiments, the parallel circuit synthesis 810 can also calculate a reward for each state 805 received from the environment 204—e.g., for each prefix graph associated with a respective state 805. That is, the parallel circuit synthesis 810 can determine an area, power, and delay for each prefix graph and state 805 received from the environment 204. In some embodiments, the parallel circuit synthesis 810 can calculate multiple rewards 815 and synthesize multiple prefix graphs concurrently—e.g., each CPU included in the parallel circuit synthesis 810 can calculate a reward 815 for a different state 805. In some examples, utilizing parallel circuit synthesis 810 can reduce a time to calculate a reward 815 for each state 805. In some embodiments, the parallel circuit synthesis 810 can send the calculated rewards 815 for each state 805 to the database 820.

In some embodiments, database 820 can be configured to store states 805, actions 210, and rewards 815—e.g., a reward 815 for each action 210 taken on a transition from a first state 805 to a second state 805. In some embodiments, the database can send the states 805, actions 210, and rewards 815 to the database—e.g., send the first state 805, the second state 805, the respective action 210 that was used to go from the first state 805 to the second state 805, and the reward calculated for the modification. In some embodiments, the optimizer 825 can access the database for the states 805, actions 210, and rewards 815.

In some embodiments, optimizer 825 can receive states 805, actions 210, and rewards 815 from the database. For example, the optimizer 825 can receive the first state 805, the second state 805, the respective action 210 that was used to go from the first state 805 to the second state 805, and the reward 815 calculated for the modification. The optimizer 825 can determine if the action 210 taken resulted in a decrease in the area, delay, or power of the data path circuit. In some examples, the optimizer 825 can train the machine learning model 240 in response to determining if the action 210 taken reduced the area, power, and/or delay of the data path circuit 108. For example, if the optimizer 825 determines the action 210 failed reduce the area, delay, and/or power of the data path circuit, the optimizer 825 can update or train the machine learning model 240 to avoid retaking such actions 210. Accordingly, the machine learning model 240 can be trained using reinforcement learning. In such embodiments, the updated machine learning model 240 can take different actions 210—e.g., cause the agent 202 to take different actions 210 in response to being trained or updated. In that, initially the agent 202 can take multiple actions 802 using an initial machine learning algorithm. While the agent 202 cycles through multiple actions, the parallel circuit synthesis 810 can concurrently calculate the rewards 815 for each action 210 taken. Because the synthesis takes longer than performing the action 210, the agent 202 can continue to cycle several actions 210 before any reward 815 is calculated. In some embodiments, when the reward 815 is calculated, the database can send the information to the optimizer 825. Accordingly, the machine learning model 240 can be updated and cause the agent to take actions 210 using the updated machine learning algorithm. The agent 202 can then cycle through actions 210 using the updated machine learning algorithm until additional rewards 815 are calculated and used by the optimizer 825 to update the machine learning algorithm a second time. The system 800 can continue using the method—e.g., calculating rewards independently of the agent 202 and environment 204 action 210 cycles while periodically updating the machine learning model 240—until an optimal target parameter for the data path circuit 108 is satisfied.

Figure 9A:
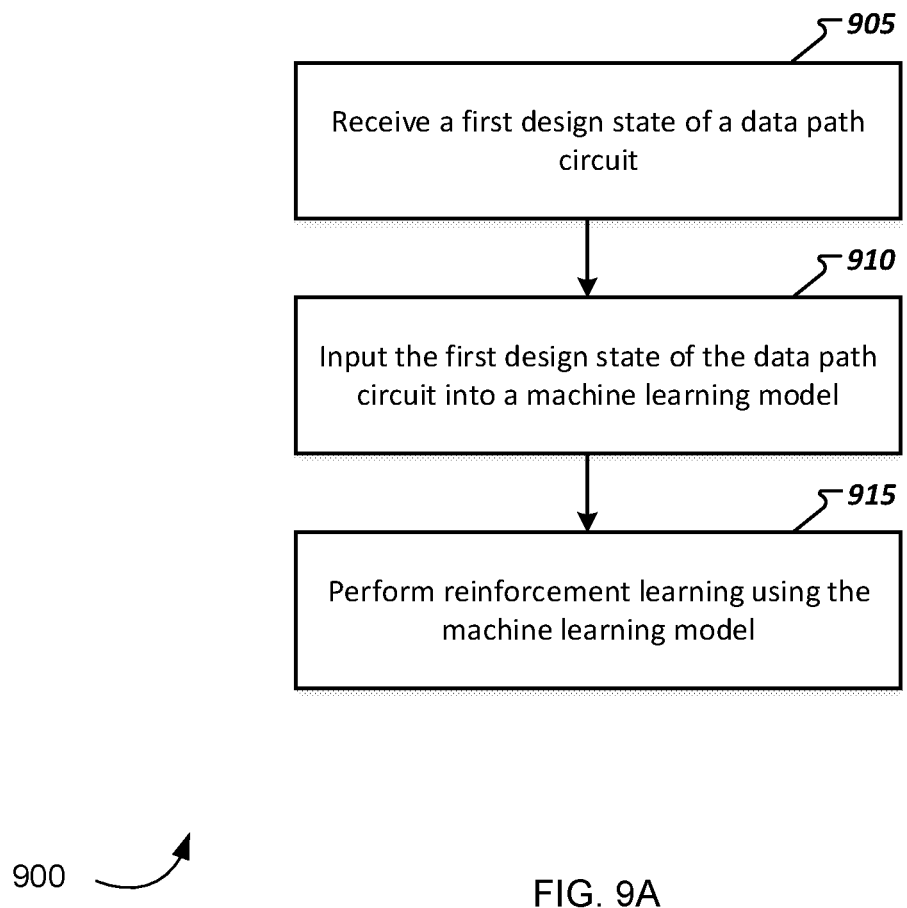
FIGS. 9A and 9B illustrate flow diagrams of example methods for data path circuit design with reinforcement learning, in accordance with at least some embodiments.

FIG. 9A illustrates a flow diagram of a method 900 for designing a data path circuit with reinforcement learning. The method 900 can be performed by processing logic comprising hardware, software, firmware, or any combination thereof. In at least one embodiment, the method 900 is performed by system 200 as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method design a data path circuit are possible.

At operation 905, the processing logic can receive a first design state of a data path circuit. In one embodiment, the data path circuit can comprise a parallel prefix circuit. In at least one embodiment, the processing logic can generate a first parallel prefix graph that represents the first design state in response to receiving the first design state. That is, the processing logic can represent the first design state of the parallel prefix circuit utilizing a first parallel prefix graph. In at least one embodiment, the processing logic can generate a grid representation of the first parallel prefix graph.

At operation 910, the processing logic can input the first design state of the data path circuit into a machine learning model. In at least one embodiment, the processing logic inputs the grid representation of the first parallel prefix graph into the machine learning model after generating the gird representation.

At operation 915, the processing logic performs reinforcement learning using the machine learning model to cause the machine learning model to output a final design state of the data path circuit. The final design state may be achieved after multiple iterations of reinforcement learning, where for each iteration a different design state is generated and assessed, and where for each iteration the machine learning model is trained to produce new design states that are improved over previous design states. In some embodiments, the final design state of the data patch circuit is associated with a final parameter value that is closer to a target parameter value associated with the first design state. That is, the processing logic can use reinforcement learning to optimize the design of the data path circuit as described with reference to FIG. 2. In some embodiments, the first parameter value and the final parameter value can represent a prediction of an area associated with the data path circuit, a delay associated with the data path circuit, a power consumption associated with the data path circuit, or any combination thereof. Accordingly, the final design state of the data patch circuit is associated with the final parameter value having an area, delay, or power consumption that is less than the first parameter value. In some embodiments, the first parameter value and the second parameter value can represent a prediction of a weighted value—e.g., a weighted value as described with reference to FIG. 6. In some embodiments, the machine learning model outputs an action that causes the processing logic to construct a grid representation of a final prefix graph that represents the final design state. That is, the machine learning model can output the action and the processing logic can utilize the action to generate a grid representation and convert the grid representation to a prefix graph that represents the final design state. In some embodiments, the machine learning model can iteratively modify the design state of the data path circuit from the first design state to the final design state, where during each iteration the machine learning model removes or adds a node of a graph of the data path circuit, each node of the graph associated with one or more components of the data path circuit—e.g., with one or more logical gates of the data path circuit.

Figure 9B:
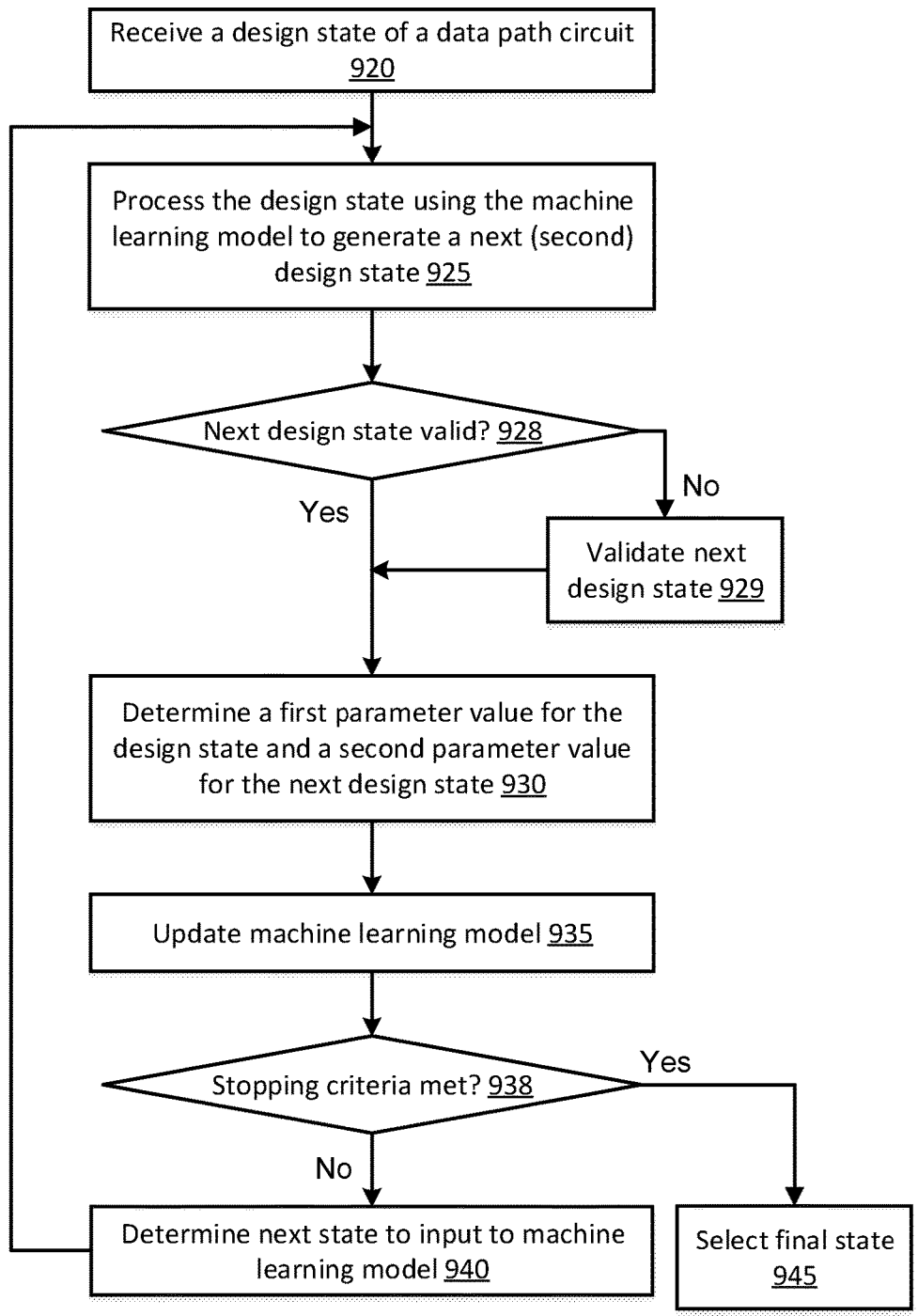

FIG. 9B illustrates a flow diagram of a method 902 for designing a data path circuit with reinforcement learning. The method 902 can be performed by processing logic comprising hardware, software, firmware, or any combination thereof. In at least one embodiment, the method 902 is performed by system 200 as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method design a data path circuit are possible.

At operation 920 of method 902, the processing logic can receive a design state of a data path circuit. In some embodiments, the processing logic can receive a first design state of the data path circuit. In some embodiments, the processing logic can generate a parallel prefix graph that represents the design state—e.g., a first parallel prefix graph that represents the first design state. In some embodiments, the processing logic can generate a grid representation of the parallel prefix graph—e.g., a first grid representation of the first parallel prefix graph. In some embodiments, the processing logic can input the grid representation to the machine learning model.

At operation 925, the processing logic can process the design state of the data path circuit using the machine learning model to generate a next design state—e.g., a second design state. In some embodiments, the machine learning model outputs the action that the environment applies to the design state of the data path circuit to generate the second design state—e.g., the modified design state. In some embodiments, the machine learning model can output the node in the grid representation to add to or delete from the first design state to generate the second design state. That is, the machine learning model can output an action the processing logic can utilize to construct a grid representation of a second graph that is associated with the second design state— e.g., a second grid representation of a second parallel prefix graph associated with the next design state. In some embodiments, the processing logic can convert the second grid representation of the graph to the second parallel prefix graph.

At operation 928, the processing logic can determine whether the second design state is valid. If the second design state is invalid, the method proceeds to operation 929. If the second design state is determined to be valid, the method continues to operation 930. At operation 929, processing logic modifies the second design state of the data path circuit to produce an updated second design state that is valid—e.g., validates the parallel prefix graph by adding and/or removing additional nodes. In some embodiments, the processing logic can convert the first and second design states to data path circuit implementations. The method then continues to operations 930.

At operation 930, the processing logic can determine a first parameter value for the first design state and determine a second parameter value for second design state—e.g., determine the first parameter value for the first design state and determine the second parameter value for the second design state. In some embodiments, the processing logic can determine the area, delay, and power associated with the design state and the next design state—e.g., the first parameter value and the second parameter value can represent the area, delay, and power. Processing logic can then determine the first parameter value based on a first area, delay and/or power (e.g., based on a first weighted combination of these values) and determine the second parameter value based on a second area, delay and/or power (e.g., based on a first weighted combination of these values).

In some embodiments, the processing logic can process the first design state using a second model (e.g., a second machine learning model or metrics predictor model), where the second model outputs the first parameter value associated with the first design state. Similarly, the processing logic can process the second design state using the second model, where the second model outputs the second parameter value associated with the second design state—e.g., the metrics predictor model can process the first design state and second design state to output the first parameter value and the second parameter value. In such embodiments, the processing device can send the grid representation of the first graph of the first design state as a first input to the second model to receive the first parameter value and send the grid representation of the second graph of the second design state as a second input to the second model to receive the second parameter value—e.g., the metric predictor model can output the first parameter value and second parameter value based on receiving the gird representation of the first and second graphs. In some embodiments, the second model can receive a circuit implementation of the first design state as a first input to determine the first parameter value and receive a circuit implementation of the second design state as a second input to determine the second parameter value—e.g., the metrics predictor model can receive the first parallel prefix graph and the second parallel prefix graph. In some embodiments, the processing logic can process the first design state and the second design statue using a circuit synthesis tool. In such embodiments, the circuit synthesis tool can output the first parameter value and the second parameter value. In some embodiments, the circuit synthesis tool can process the first design state concurrent with the machine learning model outputting the second design state of the data path circuit.

At operation 935, the processing logic can update the machine learning model—e.g., based on whether the modification selected by the machine learning model reduced or increased the area, delay, power consumption, or any combination thereof associated with the data path circuit. After updating the machine learning model, at operation 938 the processing logic can determine whether one or more stopping criteria have been met. A stopping criterion may be met, for example, after a threshold number of iterations of the design state, after one or more target goals (e.g., for area, power and/or delay) are met, after a threshold number of design state iterations have been performed without further improvement to the parameter value(s), and so on. If the stopping criterion has been met, the method may proceed to operation 945, at which a final design state may be selected for a data path circuit. The final design state may be, for example, the most recent design state or a design state encountered during iterations that obtained the best data path circuit metrics (e.g, best area, delay, power consumption, or any combination thereof) or a parameter closest to the target. If a stopping criterion has not been met, then at operation 940 processing logic may select a next design state to be input into the machine learning model. The next design state may be, for example, a most recent design state or another design state encountered during iterations. The method may return to operation 925, in which the next design state is processed using the machine learning model. The processing logic can utilize the updated machine learning model. For example, the processing logic can process the design state or next design state using the updated machine learning model—e.g., the processing logic can process the first design state or the second designs state using the machine learning model. In some embodiments, the updated machine learning model outputs a third design state of the data path circuit that is a modification of the first design state or the second design state. In at least on embodiment, the processing logic can determine a third parameter value associated with the third design state, the third parameter value closer to the target than the first parameter value or the second parameter value. The process can repeat for fourth, fifth and more design states until the stopping criterion is met.

Figure 10A:
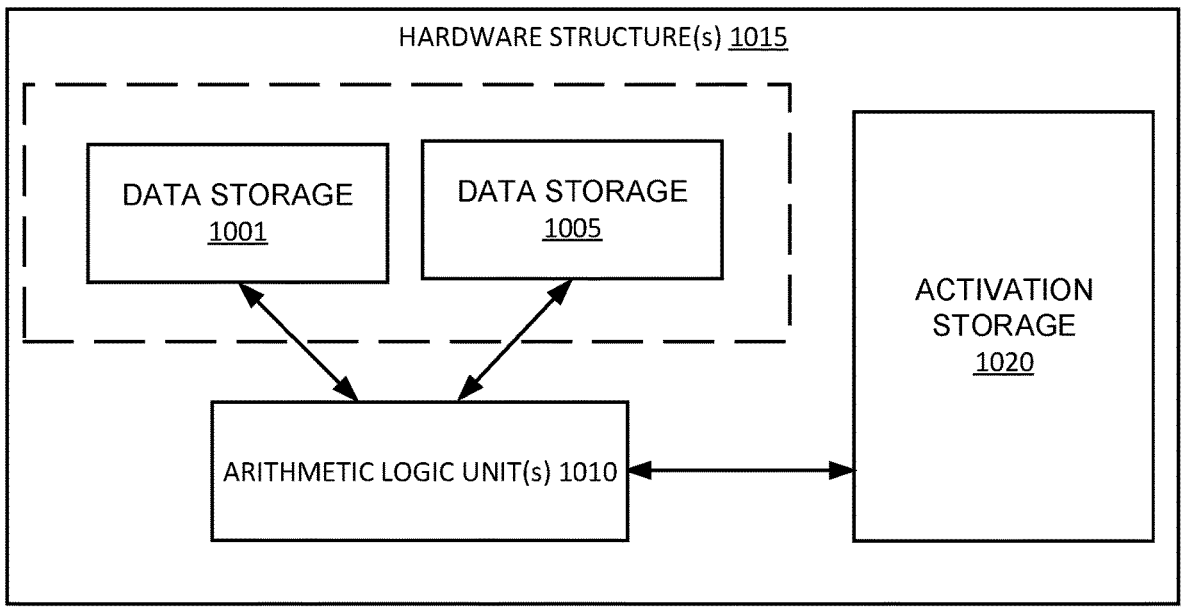
FIG. 10A illustrates an inference and/or training logic, in accordance with at least some embodiments.

FIG. 10A illustrates inference and/or training logic 1015 used to perform inferencing and/or training operations associated with one or more embodiments. Details regarding inference and/or training logic 1015 are provided below in conjunction with FIGS. 10A and/or 10B.

In at least one embodiment, inference and/or training logic 1015 may include, without limitation, code and/or data storage 1001 to store forward and/or output weight and/or input/output data, and/or other parameters to configure neurons or layers of a neural network trained and/or used for inferencing in aspects of one or more embodiments. In at least one embodiment, training logic 1015 may include, or be coupled to code and/or data storage 1001 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1001 may be included with other on-chip or off-chip data storage, including a processor's L1, L2, or L3 cache or system memory.

In at least one embodiment, any portion of code and/or data storage 1001 may be internal or external to one or more processors or other hardware logic devices or circuits. In at least one embodiment, code and/or code and/or data storage 1001 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1001 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 may include, without limitation, a code and/or data storage 1005 to store backward and/or output weight and/or input/output data corresponding to neurons or layers of a neural network trained and/or used for inferencing in aspects of one or more embodiments. In at least one embodiment, code and/or data storage 1005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1015 may include, or be coupled to code and/or data storage 1005 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1005 may be included with other on-chip or off-chip data storage, including a processor's L1, L2, or L3 cache or system memory. In at least one embodiment, any portion of code and/or data storage 1005 may be internal or external to on one or more processors or other hardware logic devices or circuits. In at least one embodiment, code and/or data storage 1005 may be cache memory, DRAM, SRAM, non-volatile memory (e.g., Flash memory), or other storage. In at least one embodiment, choice of whether code and/or data storage 1005 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1001 and code and/or data storage 1005 may be separate storage structures. In at least one embodiment, code and/or data storage 1001 and code and/or data storage 1005 may be same storage structure. In at least one embodiment, code and/or data storage 1001 and code and/or data storage 1005 may be partially same storage structure and partially separate storage structures. In at least one embodiment, any portion of code and/or data storage 1001 code and/or data storage 1005 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1005 and/or code and/or data storage 1001 are used as operands along with other values, such as bias values, gradient information, momentum values, or other parameters or hyperparameters, any or all of which may be stored in code and/or data storage 1005 or code and/or data storage 1001 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. 10A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10A may be used in conjunction with central processing unit ("CPU") hardware, graphics processing unit ("GPU") hardware or other hardware, such as data processing unit ("DPU") hardware, or field programmable gate arrays ("FPGAs").

Figure 10B:
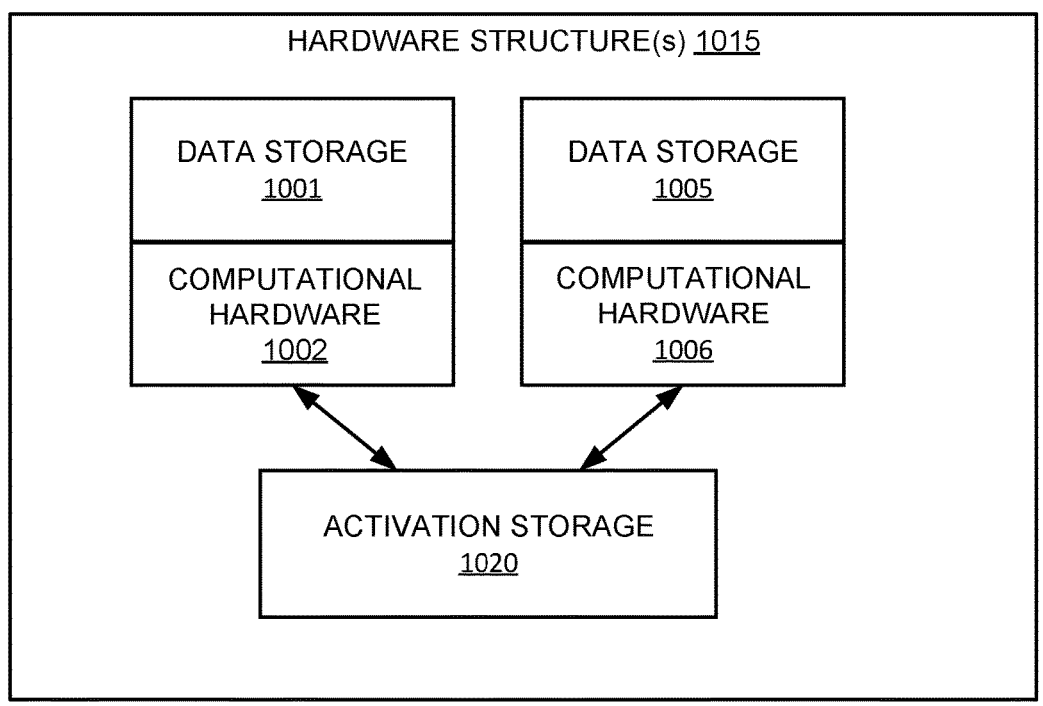
FIG. 10B illustrates an inference and/or training logic, in accordance with at least some embodiments.

FIG. 10B illustrates inference and/or training logic 1015, according to at least one or more embodiments. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10B, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one "storage/computational pair 1001/1002" of code and/or data storage 1001 and computational hardware 1002 is provided as an input to "storage/computational pair 1005/1006" of code and/or data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Figure 11:
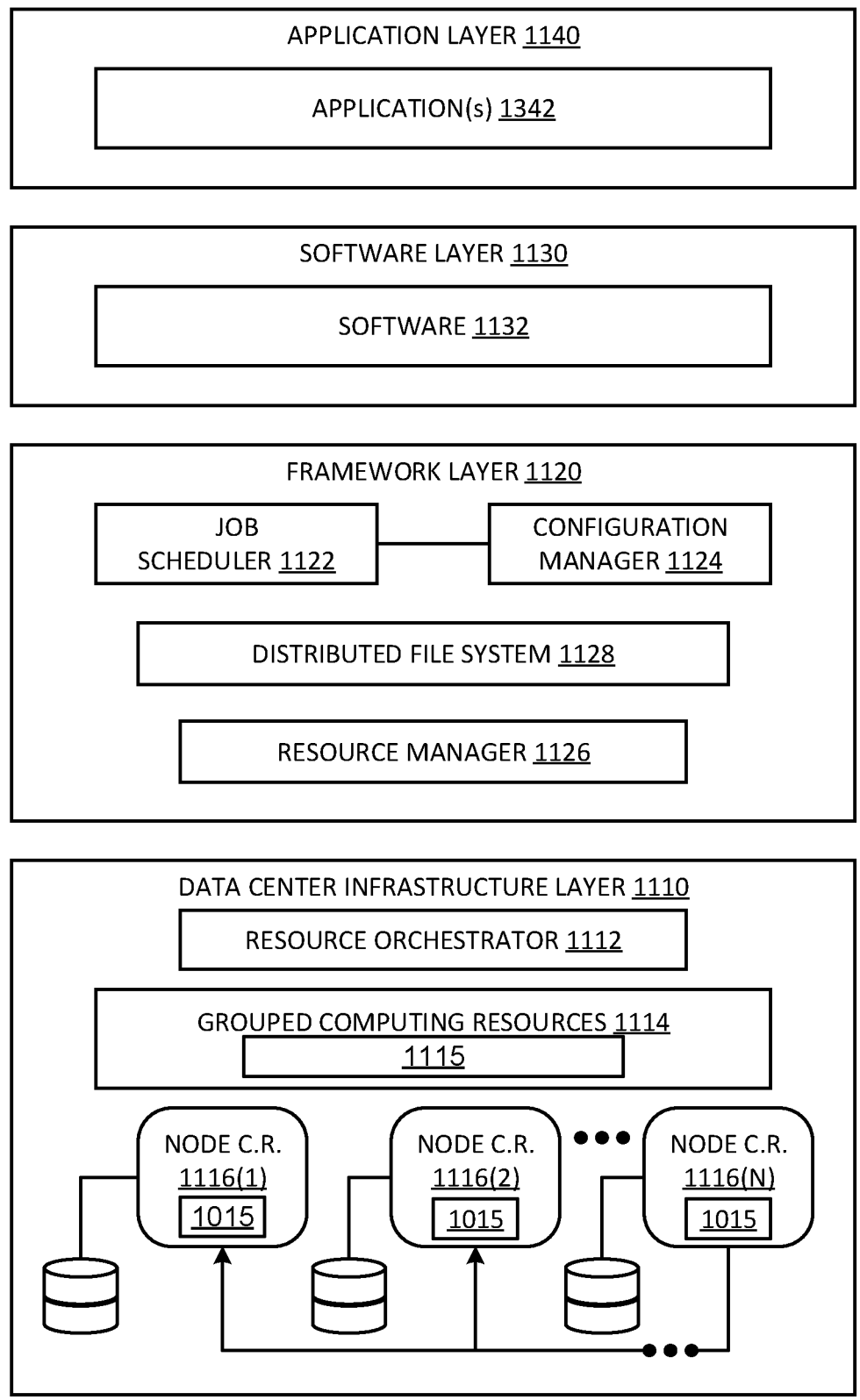
FIG. 11 illustrates an example data center system, in accordance with at least some embodiments.

FIG. 11 illustrates an example data center 1100, in which at least one embodiment may be used. In at least one embodiment, data center 1100 includes a data center infrastructure layer 1110, a framework layer 1120, a software layer 1130, and an application layer 1240.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resource 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. The one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 11 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 12:
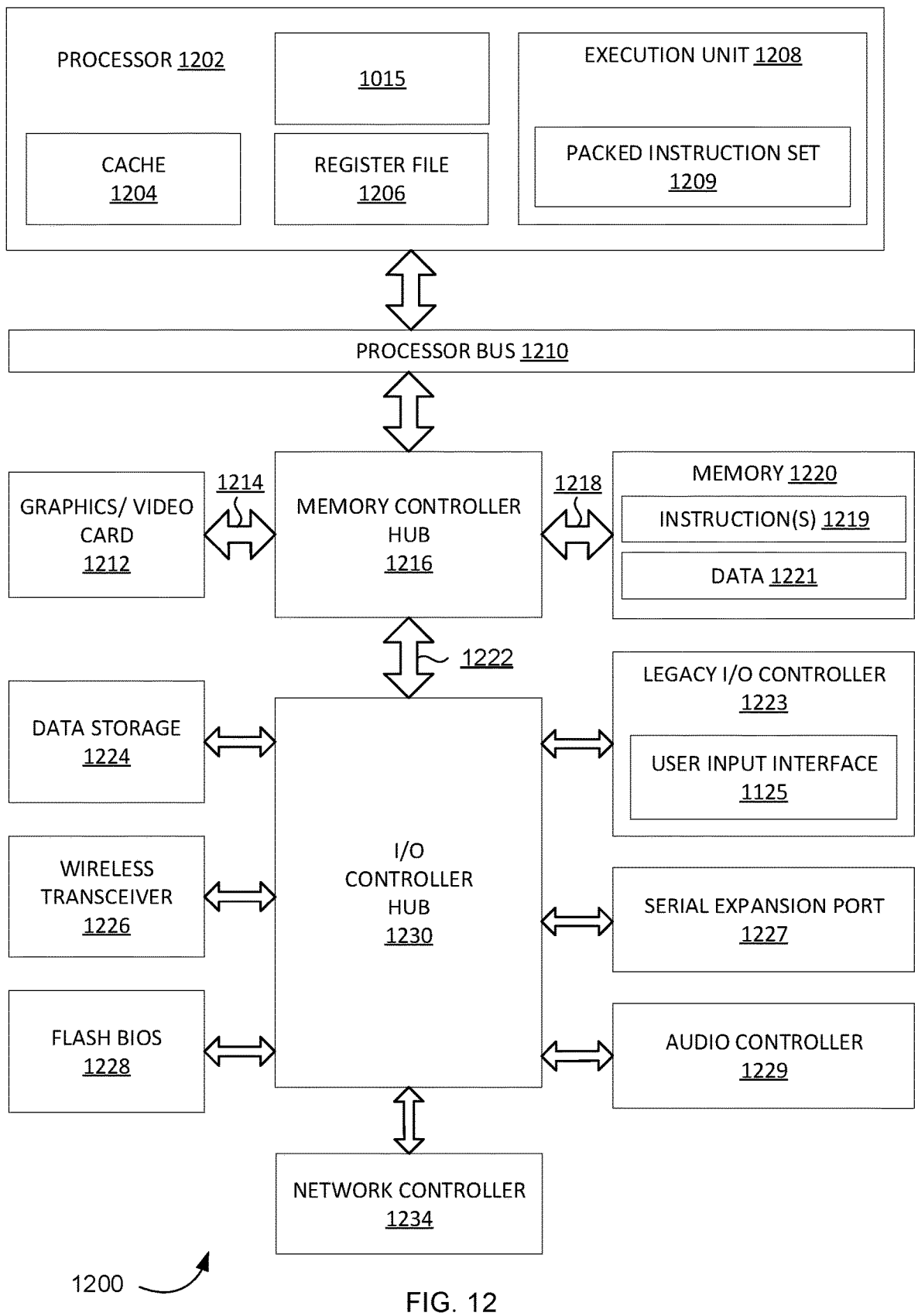
FIG. 12 illustrates a computer system, in accordance with at least some embodiments.

FIG. 12 is a block diagram illustrating an exemplary computer system, which may be a system with interconnected devices and components, a system-on-a-chip (SOC) or some combination thereof 1200 formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 1200 may include, without limitation, processor 1202 that may include, without limitation, one or more execution units 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interfaces 1225, a serial expansion port 1227, such as Universal Serial Bus ("USB"), and a network controller 1234, which may include in some embodiments, a data processing unit. Data storage 1224 may comprise a hard disk drive, a floppy disk drive, a CD-ROM device, a flash memory device, or other mass storage device.

In at least one embodiment, FIG. 12 illustrates a system, which includes interconnected hardware devices or "chips", whereas in other embodiments, FIG. 12 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1200 are interconnected using compute express link (CXL) interconnects.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 12 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 13:
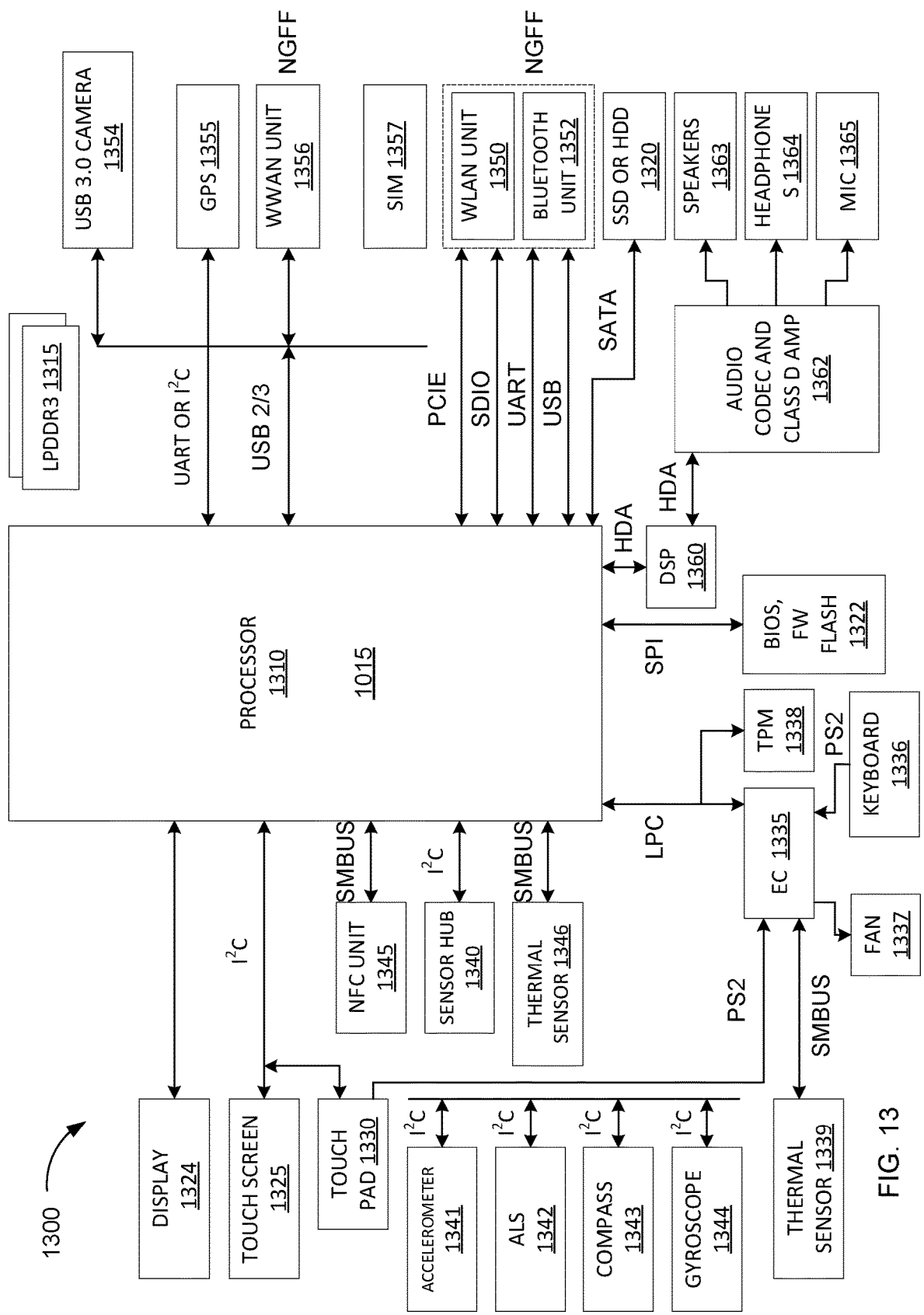
FIG. 13 illustrates a computer system, in accordance with at least some embodiments.

FIG. 13 is a block diagram illustrating an electronic device 1300 for utilizing a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates a system, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NEC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1336, and a touch pad 1330 may be communicatively coupled to EC 1335. In at least one embodiment, speaker 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1364 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 13 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 14:
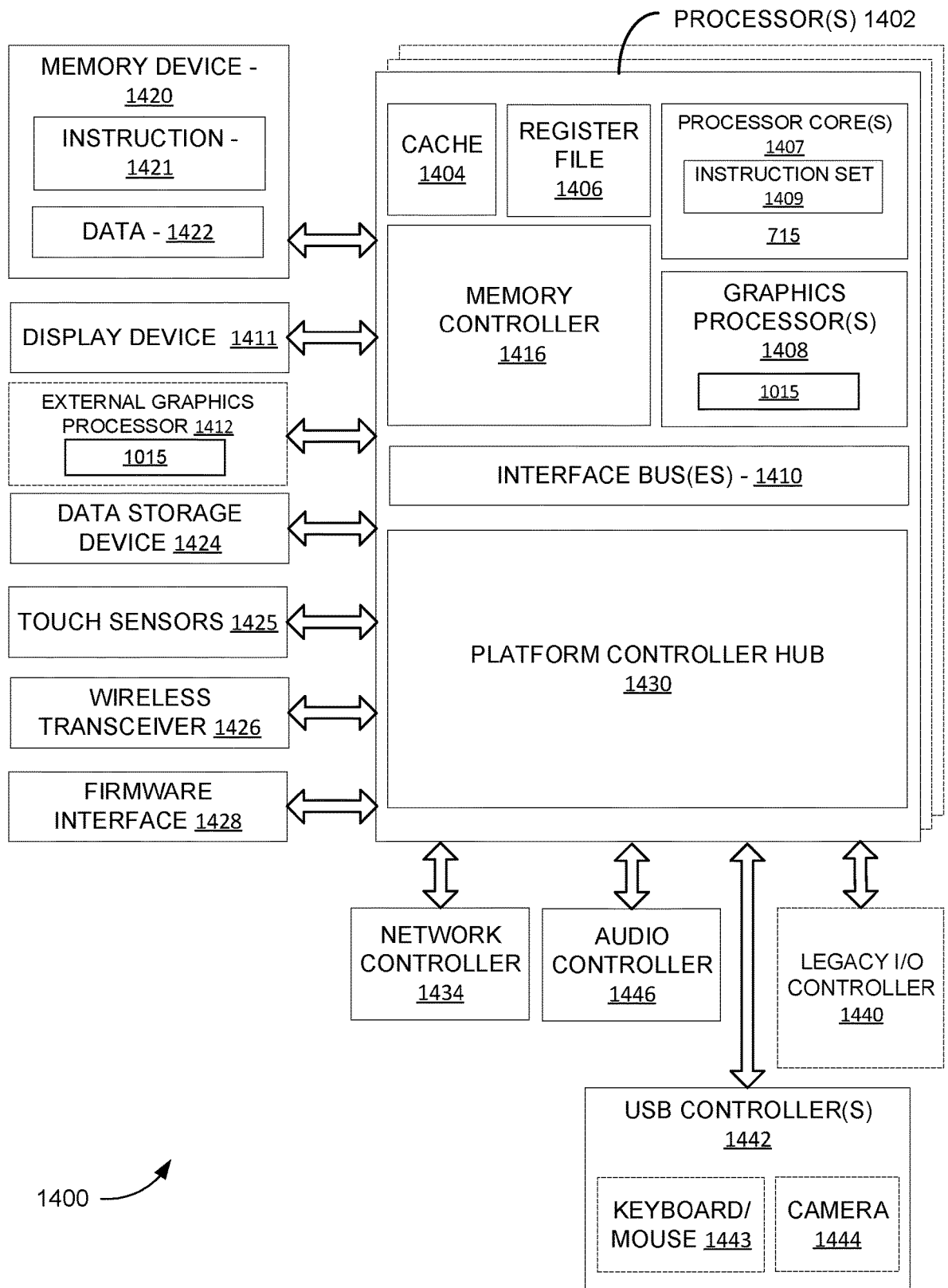
FIG. 14 illustrates at least portions of a graphics processor, in accordance with at least some embodiments.

FIG. 14 is a block diagram of a processing system, according to at least one embodiment. In at least one embodiment, system 1400 includes one or more processors 1402 and one or more graphics processors 1408, and may be a single processor desktop system, a multiprocessor workstation system, or a server system having a large number of processors 1402 or processor cores 1407. In at least one embodiment, system 1400 is a processing platform incorporated within a system-on-a-chip (SoC) integrated circuit for use in mobile, handheld, edge, or embedded devices.

In at least one embodiment, system 1400 may include, or be incorporated within a server-based gaming platform, a game console, including a game and media console, a mobile gaming console, a handheld game console, or an online game console. In at least one embodiment, system 1400 is a mobile phone, smart phone, tablet computing device or mobile Internet device. In at least one embodiment, processing system 1400 may also include, couple with, or be integrated within a wearable device, such as a smart watch wearable device, smart eyewear device, augmented reality device, or virtual reality device. In at least one embodiment, processing system 1400 is a television or set top box device having one or more processors 1402 and a graphical interface generated by one or more graphics processors 1408.

In at least one embodiment, one or more processors 1402 each include one or more processor cores 1407 to process instructions which, when executed, perform operations for system and user software. In at least one embodiment, each of one or more processor cores 1407 is configured to process a specific instruction set 1409. In at least one embodiment, instruction set 1409 may facilitate Complex Instruction Set Computing (CISC), Reduced Instruction Set Computing (RISC), or computing via a Very Long Instruction Word (VLIW). In at least one embodiment, processor cores 1407 may each process a different instruction set 1409, which may include instructions to facilitate emulation of other instruction sets. In at least one embodiment, processor core 1407 may also include other processing devices, such a Digital Signal Processor (DSP).

In at least one embodiment, processor 1402 includes cache memory 1404. In at least one embodiment, processor 1402 may have a single internal cache or multiple levels of internal cache. In at least one embodiment, cache memory is shared among various components of processor 1402. In at least one embodiment, processor 1402 also uses an external cache (e.g., a Level-3 (L3) cache or Last Level Cache (LLC)) (not shown), which may be shared among processor cores 1407 using known cache coherency techniques. In at least one embodiment, register file 1406 is additionally included in processor 1402 which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor 1402 and other components in system 1400. In at least one embodiment, interface bus 1410, in one embodiment, may be a processor bus, such as a version of a Direct Media Interface (DMI) bus. In at least one embodiment, interface 1410 is not limited to a DMI bus, and may include one or more Peripheral Component Interconnect buses (e.g., PCI, PCI Express), memory busses, or other types of interface busses. In at least one embodiment processor(s) 1402 include an integrated memory controller 1416 and a platform controller hub 1430. In at least one embodiment, memory controller 1416 facilitates communication between a memory device and other components of system 1400, while platform controller hub (PCH) 1430 provides connections to I/O devices via a local I/O bus.

In at least one embodiment, memory device 1420 may be a dynamic random access memory (DRAM) device, a static random access memory (SRAM) device, flash memory device, phase-change memory device, or some other memory device having suitable performance to serve as process memory. In at least one embodiment memory device 1420 may operate as system memory for system 1400, to store data 1422 and instructions 1421 for use when one or more processors 1402 executes an application or process. In at least one embodiment, memory controller 1416 also couples with an optional external graphics processor 1412, which may communicate with one or more graphics processors 1408 in processors 1402 to perform graphics and media operations. In at least one embodiment, a display device 1411 may connect to processor(s) 1402. In at least one embodiment display device 1411 may include one or more of an internal display device, as in a mobile electronic device or a laptop device or an external display device attached via a display interface (e.g., DisplayPort, etc.). In at least one embodiment, display device 1411 may include a head mounted display (HMD) such as a stereoscopic display device for use in virtual reality (VR) applications or augmented reality (AR) applications.

In at least one embodiment, platform controller hub 1430 enables peripherals to connect to memory device 1420 and processor 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 may connect via a storage interface (e.g., SATA) or via a peripheral bus, such as a Peripheral Component Interconnect bus (e.g., PCI, PCI Express). In at least one embodiment, touch sensors 1425 may include touch screen sensors, pressure sensors, or fingerprint sensors. In at least one embodiment, wireless transceiver 1426 may be a Wi-Fi transceiver, a Bluetooth transceiver, or a mobile network transceiver such as a 3G, 4G, or Long Term Evolution (LTE) transceiver. In at least one embodiment, firmware interface 1428 enables communication with system firmware, and may be, for example, a unified extensible firmware interface (UEFI). In at least one embodiment, network controller 1434 may enable a network connection to a wired network. In at least one embodiment, a high-performance network controller (not shown) couples with interface bus 1410. In at least one embodiment, audio controller 1446 is a multi-channel high definition audio controller. In at least one embodiment, system 1400 includes an optional legacy I/O controller 1440 for coupling legacy (e.g., Personal System 2 (PS/2)) devices to system. In at least one embodiment, platform controller hub 1430 may also connect to one or more Universal Serial Bus (USB) controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1411. In at least one embodiment, platform controller hub 1430 and/or memory controller 1416 may be external to one or more processor(s) 1402. For example, in at least one embodiment, system 1400 may include an external memory controller 1416 and platform controller hub 1430, which may be configured as a memory controller hub and peripheral controller hub within a system chipset that is in communication with processor(s) 1402.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into graphics processor 1408. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 15:
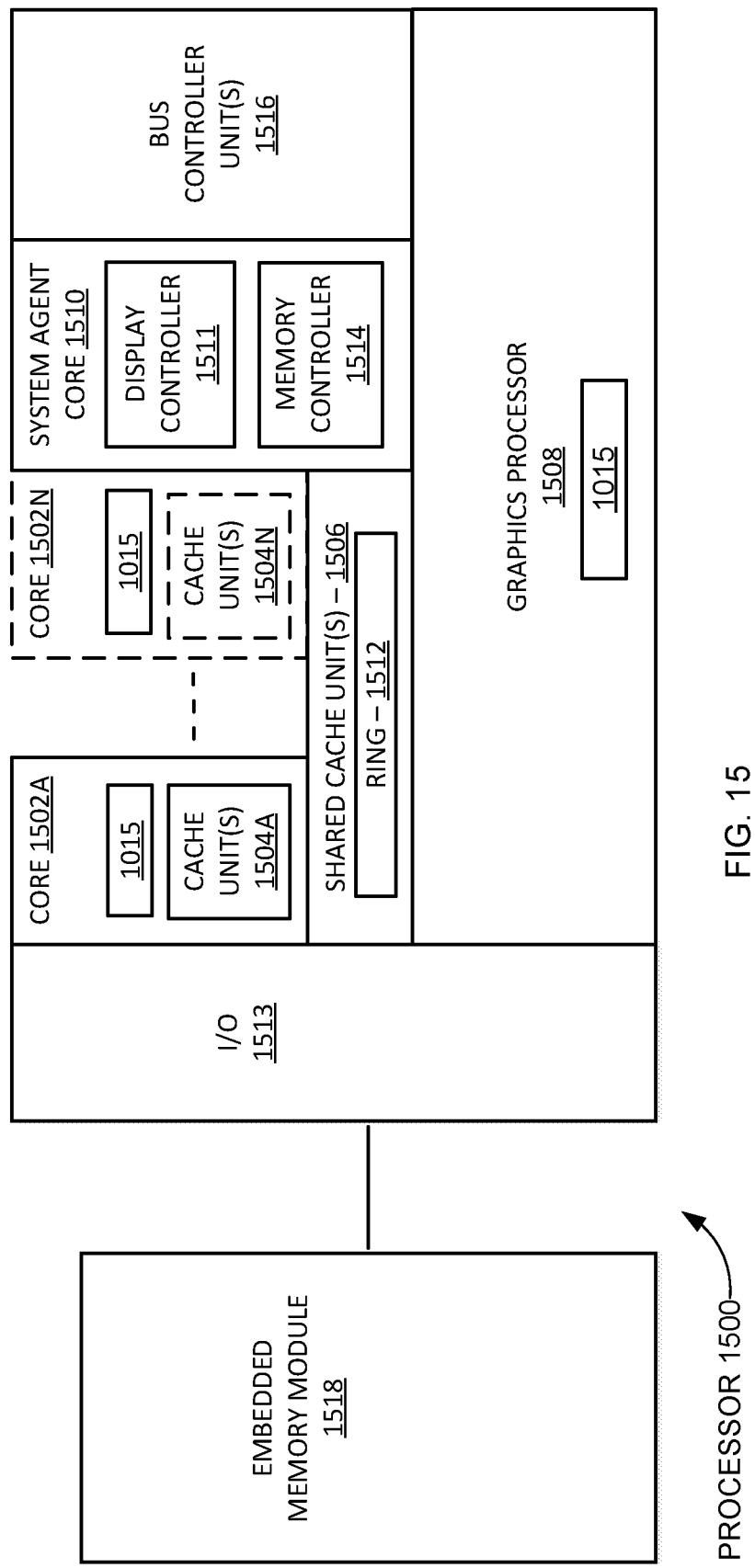
FIG. 15 illustrates at least portions of a graphic processor, in accordance with at least some embodiments.

FIG. 15 is a block diagram of a processor 1500 having one or more processor cores 1502A-1502N, an integrated memory controller 1513, and an integrated graphics processor 1508, according to at least one embodiment. In at least one embodiment, processor 1500 may include additional cores up to and including additional core 1502N represented by dashed lined boxes. In at least one embodiment, each of processor cores 1502A-1502N includes one or more internal cache units 1504A-1504N. In at least one embodiment, each processor core also has access to one or more shared cached units 1506.

In at least one embodiment, internal cache units 1504A-1504N and shared cache units 1506 represent a cache memory hierarchy within processor 1500. In at least one embodiment, cache memory units 1504A-1504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1506 and 1504A-1504N.

In at least one embodiment, processor 1500 may also include a set of one or more bus controller units 1516 and a system agent core 1510. In at least one embodiment, one or more bus controller units 1516 manage a set of peripheral buses, such as one or more PCI or PCI express busses. In at least one embodiment, system agent core 1510 provides management functionality for various processor components. In at least one embodiment, system agent core 1510 includes one or more integrated memory controllers 1513 to manage access to various external memory devices (not shown).

In at least one embodiment, one or more of processor cores 1502A-1502N include support for simultaneous multi-threading. In at least one embodiment, system agent core 1510 includes components for coordinating and operating cores 1502A-1502N during multi-threaded processing. In at least one embodiment, system agent core 1510 may additionally include a power control unit (PCU), which includes logic and components to regulate one or more power states of processor cores 1502A-1502N and graphics processor 1508.

In at least one embodiment, processor 1500 additionally includes graphics processor 1508 to execute graphics processing operations. In at least one embodiment, graphics processor 1508 couples with shared cache units 1506, and system agent core 1510, including one or more integrated memory controllers 1513. In at least one embodiment, system agent core 1510 also includes a display controller 1511 to drive graphics processor output to one or more coupled displays. In at least one embodiment, display controller 1511 may also be a separate module coupled with graphics processor 1508 via at least one interconnect, or may be integrated within graphics processor 1508.

In at least one embodiment, a ring based interconnect unit 1512 is used to couple internal components of processor 1500. In at least one embodiment, an alternative interconnect unit may be used, such as a point-to-point interconnect, a switched interconnect, or other techniques. In at least one embodiment, graphics processor 1508 couples with ring interconnect 1512 via an I/O link 1513.

In at least one embodiment, I/O link 1513 represents at least one of multiple varieties of I/O interconnects, including an on package I/O interconnect which facilitates communication between various processor components and a high-performance embedded memory module 1518, such as an eDRAM module. In at least one embodiment, each of processor cores 1502A-1502N and graphics processor 1508 use embedded memory modules 1518 as a shared Last Level Cache.

In at least one embodiment, processor cores 1502A-1502N are homogenous cores executing a common instruction set architecture. In at least one embodiment, processor cores 1502A-1502N are heterogeneous in terms of instruction set architecture (ISA), where one or more of processor cores 1502A-1502N execute a common instruction set, while one or more other cores of processor cores 1502A-1502N executes a subset of a common instruction set or a different instruction set. In at least one embodiment, processor cores 1502A-1502N are heterogeneous in terms of microarchitecture, where one or more cores having a relatively higher power consumption couple with one or more power cores having a lower power consumption. In at least one embodiment, processor 1500 may be implemented on one or more chips or as an SoC integrated circuit.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into processor 1500. For example, in at least one embodiment, training and/or inferencing techniques described herein may use one or more of ALUs embodied in graphics processor 1508, graphics core(s) 1502A-1502N, or other components in FIG. 15. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 1500 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 16:
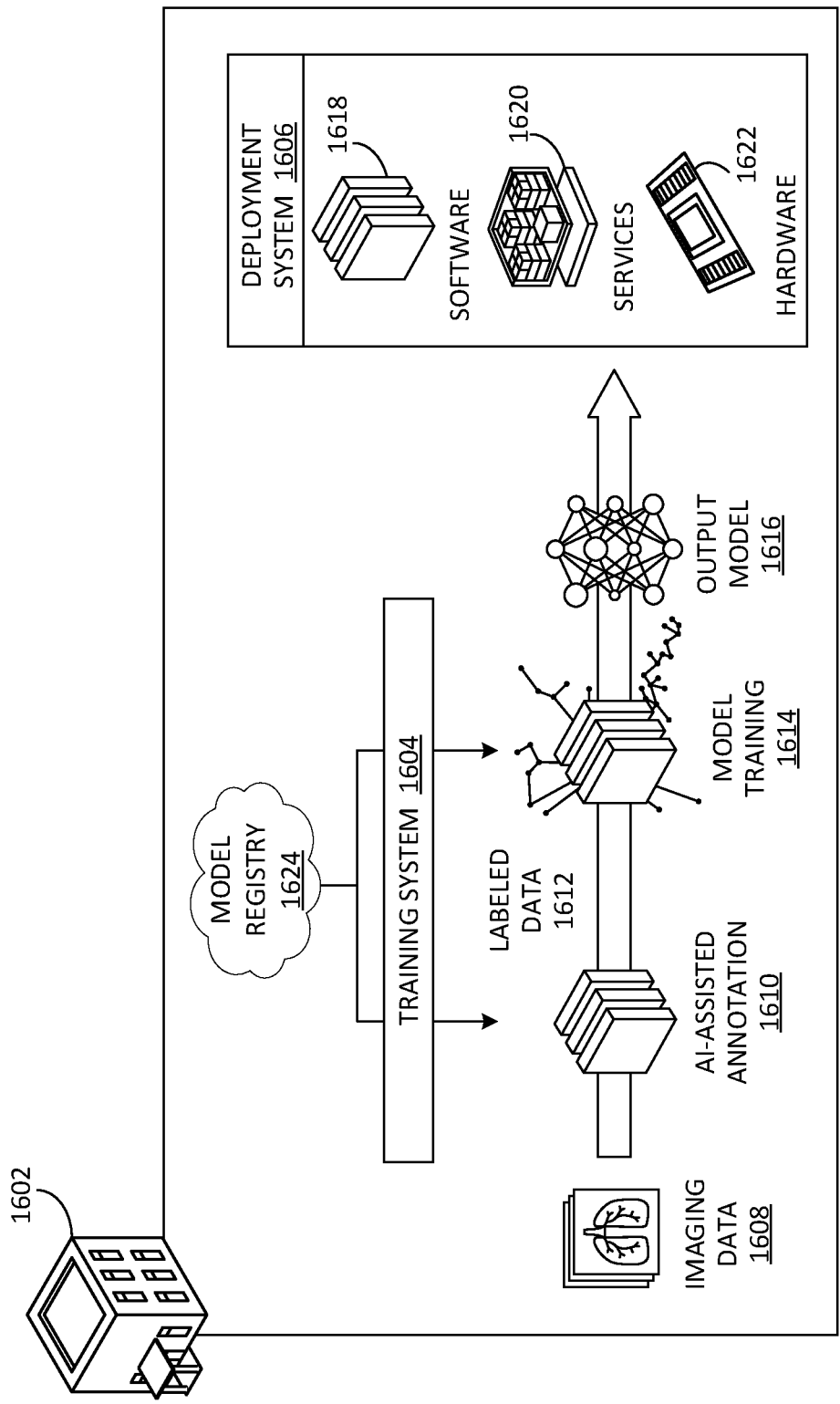
FIG. 16 illustrates an example data flow diagram for an advanced computing pipeline, in accordance with at least some embodiments.

FIG. 16 is an example data flow diagram for a process 1600 of generating and deploying an image processing and inferencing pipeline, in accordance with at least one embodiment. In at least one embodiment, process 1600 may be deployed for use with imaging devices, processing devices, and/or other device types at one or more facilities 1602. Process 1600 may be executed within a training system 1604 and/or a deployment system 1606. In at least one embodiment, training system 1604 may be used to perform training, deployment, and implementation of machine learning models (e.g., neural networks, object detection algorithms, computer vision algorithms, etc.) for use in deployment system 1606. In at least one embodiment, deployment system 1606 may be configured to offload processing and compute resources among a distributed computing environment to reduce infrastructure requirements at facility 1602. In at least one embodiment, one or more applications in a pipeline may use or call upon services (e.g., inference, visualization, compute, AI, etc.) of deployment system 1606 during execution of applications.

In at least one embodiment, some of applications used in advanced processing and inferencing pipelines may use machine learning models or other AI to perform one or more processing steps. In at least one embodiment, machine learning models may be trained at facility 1602 using data 1608 (such as imaging data) generated at facility 1602 (and stored on one or more picture archiving and communication system (PACS) servers at facility 1602), may be trained using imaging or sequencing data 1608 from another facility(ies), or a combination thereof. In at least one embodiment, training system 1604 may be used to provide applications, services, and/or other resources for generating working, deployable machine learning models for deployment system 1606.

In at least one embodiment, model registry 1624 may be backed by object storage that may support versioning and object metadata. In at least one embodiment, object storage may be accessible through, for example, a cloud storage (e.g., cloud 1726 of FIG. 17) compatible application programming interface (API) from within a cloud platform. In at least one embodiment, machine learning models within model registry 1624 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1704 (FIG. 17) may include a scenario where facility 1602 is training their own machine learning model, or has an existing machine learning model that needs to be optimized or updated. In at least one embodiment, imaging data 1608 generated by imaging device(s), sequencing devices, and/or other device types may be received. In at least one embodiment, once imaging data 1608 is received, AI-assisted annotation 1610 may be used to aid in generating annotations corresponding to imaging data 1608 to be used as ground truth data for a machine learning model. In at least one embodiment, AI-assisted annotation 1610 may include one or more machine learning models (e.g., convolutional neural networks (CNNs)) that may be trained to generate annotations corresponding to certain types of imaging data 1608 (e.g., from certain devices). In at least one embodiment, AI-assisted annotations 1610 may then be used directly, or may be adjusted or fine-tuned using an annotation tool to generate ground truth data. In at least one embodiment, AI-assisted annotations 1610, labeled clinic data 1612, or a combination thereof may be used as ground truth data for training a machine learning model. In at least one embodiment, a trained machine learning model may be referred to as output model 1616, and may be used by deployment system 1606, as described herein.

In at least one embodiment, training pipeline 1704 (FIG. 17) may include a scenario where facility 1602 needs a machine learning model for use in performing one or more processing tasks for one or more applications in deployment system 1606, but facility 1602 may not currently have such a machine learning model (or may not have a model that is optimized, efficient, or effective for such purposes). In at least one embodiment, an existing machine learning model may be selected from a model registry 1624. In at least one embodiment, model registry 1624 may include machine learning models trained to perform a variety of different inference tasks on imaging data. In at least one embodiment, machine learning models in model registry 1624 may have been trained on imaging data from different facilities than facility 1602 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1624. In at least one embodiment, a machine learning model may then be retrained, or updated, at any number of other facilities, and a retrained or updated model may be made available in model registry 1624. In at least one embodiment, a machine learning model may then be selected from model registry 1624—and referred to as output model 1616—and may be used in deployment system 1606 to perform one or more processing tasks for one or more applications of a deployment system.

In at least one embodiment, training pipeline 1704 (FIG. 17), a scenario may include facility 1602 requiring a machine learning model for use in performing one or more processing tasks for one or more applications in deployment system 1606, but facility 1602 may not currently have such a machine learning model (or may not have a model that is optimized, efficient, or effective for such purposes). In at least one embodiment, a machine learning model selected from model registry 1624 may not be fine-tuned or optimized for imaging data 1608 generated at facility 1602 because of differences in populations, robustness of training data used to train a machine learning model, diversity in anomalies of training data, and/or other issues with training data. In at least one embodiment, AI-assisted annotation 1610 may be used to aid in generating annotations corresponding to imaging data 1608 to be used as ground truth data for retraining or updating a machine learning model. In at least one embodiment, labeled data 1612 may be used as ground truth data for training a machine learning model. In at least one embodiment, retraining or updating a machine learning model may be referred to as model training 1614. In at least one embodiment, model training 1614—e.g., AI-assisted annotations 1610, labeled clinic data 1612, or a combination thereof—may be used as ground truth data for retraining or updating a machine learning model. In at least one embodiment, a trained machine learning model may be referred to as output model 1616, and may be used by deployment system 1606, as described herein.

In at least one embodiment, deployment system 1606 may include software 1618, services 1620, hardware 1622, and/or other components, features, and functionality. In at least one embodiment, deployment system 1606 may include a software "stack," such that software 1618 may be built on top of services 1620 and may use services 1620 to perform some or all of processing tasks, and services 1620 and software 1618 may be built on top of hardware 1622 and use hardware 1622 to execute processing, storage, and/or other compute tasks of deployment system 1606. In at least one embodiment, software 1618 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1608, in addition to containers that receive and configure imaging data for use by each container and/or for use by facility 1602 after processing through a pipeline (e.g., to convert outputs back to a usable data type). In at least one embodiment, a combination of containers within software 1618 (e.g., that make up a pipeline) may be referred to as a virtual instrument (as described in more detail herein), and a virtual instrument may leverage services 1620 and hardware 1622 to execute some or all processing tasks of applications instantiated in containers.

In at least one embodiment, a data processing pipeline may receive input data (e.g., imaging data 1608) in a specific format in response to an inference request (e.g., a request from a user of deployment system 1606). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1616 of training system 1604.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1624 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1620 as a system (e.g., system 1700 of FIG. 17). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1700 (e.g., for accuracy), an application may be available in a container registry for selection and/or implementation by a user to perform one or more processing tasks with respect to data at a facility (e.g., a second facility) of a user.

Figure 17:
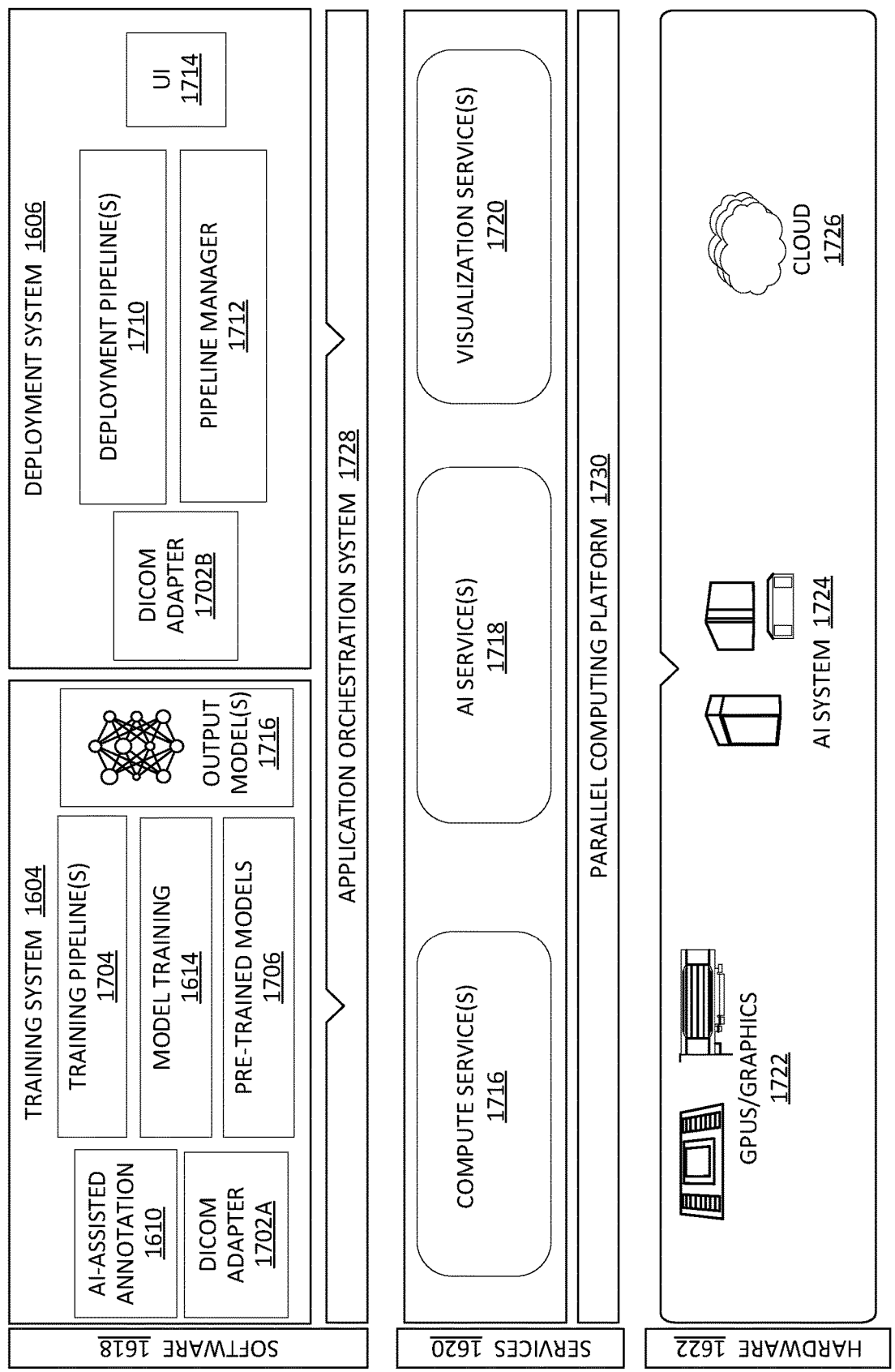
FIG. 17 illustrates a system diagram for an example system for training, adapting, instantiating and deploying machine learning models in an advanced computing pipeline, in accordance with at least some embodiment.

In at least one embodiment, developers may then share applications or containers through a network for access and use by users of a system (e.g., system 1700 of FIG. 17). In at least one embodiment, completed and validated applications or containers may be stored in a container registry and associated machine learning models may be stored in model registry 1624. In at least one embodiment, a requesting entity—who provides an inference or image processing request—may browse a container registry and/or model registry 1624 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1606 (e.g., a cloud) to perform processing of data processing pipeline. In at least one embodiment, processing by deployment system 1606 may include referencing selected elements (e.g., applications, containers, models, etc.) from a container registry and/or model registry 1624. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1620 may be leveraged. In at least one embodiment, services 1620 may include compute services, artificial intelligence (AI) services, visualization services, and/or other service types. In at least one embodiment, services 1620 may provide functionality that is common to one or more applications in software 1618, so functionality may be abstracted to a service that may be called upon or leveraged by applications. In at least one embodiment, functionality provided by services 1620 may run dynamically and more efficiently, while also scaling well by allowing applications to process data in parallel (e.g., using a parallel computing platform 1730 (FIG. 17)). In at least one embodiment, rather than each application that shares a same functionality offered by a service 1620 being required to have a respective instance of service 1620, service 1620 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1620 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1618 implementing advanced processing and inferencing pipeline that includes segmentation application and anomaly detection application may be streamlined because each application may call upon a same inference service to perform one or more inferencing tasks.

In at least one embodiment, hardware 1622 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1622 may be used to provide efficient, purpose-built support for software 1618 and services 1620 in deployment system 1606. In at least one embodiment, use of GPU processing may be implemented for processing locally (e.g., at facility 1602), within an AI/deep learning system, in a cloud system, and/or in other processing components of deployment system 1606 to improve efficiency, accuracy, and efficacy of image processing and generation. In at least one embodiment, software 1618 and/or services 1620 may be optimized for GPU processing with respect to deep learning, machine learning, and/or high-performance computing, as non-limiting examples. In at least one embodiment, at least some of computing environment of deployment system 1606 and/or training system 1604 may be executed in a datacenter one or more supercomputers or high performance computing systems, with GPU optimized software (e.g., hardware and software combination of NVIDIA's DGX System). In at least one embodiment, hardware 1622 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 17 is a system diagram for an example system 1700 for generating and deploying an imaging deployment pipeline, in accordance with at least one embodiment. In at least one embodiment, system 1700 may be used to implement process 1600 of FIG. 16 and/or other processes including advanced processing and inferencing pipelines. In at least one embodiment, system 1700 may include training system 1604 and deployment system 1606. In at least one embodiment, training system 1604 and deployment system 1606 may be implemented using software 1618, services 1620, and/or hardware 1622, as described herein.

In at least one embodiment, system 1700 (e.g., training system 1604 and/or deployment system 1606) may implemented in a cloud computing environment (e.g., using cloud 1726). In at least one embodiment, system 1700 may be implemented locally with respect to a healthcare services facility, or as a combination of both cloud and local computing resources. In at least one embodiment, access to APIs in cloud 1726 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1700, may be restricted to a set of public IPs that have been vetted or authorized for interaction.

In at least one embodiment, various components of system 1700 may communicate between and among one another using any of a variety of different network types, including but not limited to local area networks (LANs) and/or wide area networks (WANs) via wired and/or wireless communication protocols. In at least one embodiment, communication between facilities and components of system 1700 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1604 may execute training pipelines 1704, similar to those described herein with respect to FIG. 16. In at least one embodiment, where one or more machine learning models are to be used in deployment pipelines 1710 by deployment system 1606, training pipelines 1704 may be used to train or retrain one or more (e.g. pre-trained) models, and/or implement one or more of pre-trained models 1706 (e.g., without a need for retraining or updating). In at least one embodiment, as a result of training pipelines 1704, output model(s) 1616 may be generated. In at least one embodiment, training pipelines 1704 may include any number of processing steps, such as but not limited to imaging data (or other input data) conversion or adaption In at least one embodiment, for different machine learning models used by deployment system 1606, different training pipelines 1704 may be used. In at least one embodiment, training pipeline 1704 similar to a first example described with respect to FIG. 16 may be used for a first machine learning model, training pipeline 1704 similar to a second example described with respect to FIG. 16 may be used for a second machine learning model, and training pipeline 1704 similar to a third example described with respect to FIG. 16 may be used for a third machine learning model. In at least one embodiment, any combination of tasks within training system 1604 may be used depending on what is required for each respective machine learning model. In at least one embodiment, one or more of machine learning models may already be trained and ready for deployment so machine learning models may not undergo any processing by training system 1604, and may be implemented by deployment system 1606.

In at least one embodiment, output model(s) 1616 and/or pre-trained model(s) 1706 may include any types of machine learning models depending on implementation or embodiment. In at least one embodiment, and without limitation, machine learning models used by system 1700 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1704 may include AI-assisted annotation, as described in more detail herein with respect to at least FIG. 16B. In at least one embodiment, labeled data 1612 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1608 (or other data type used by machine learning models), there may be corresponding ground truth data generated by training system 1604. In at least one embodiment, AI-assisted annotation may be performed as part of deployment pipelines 1710; either in addition to, or in lieu of AI-assisted annotation included in training pipelines 1704. In at least one embodiment, system 1700 may include a multi-layer platform that may include a software layer (e.g., software 1618) of diagnostic applications (or other application types) that may perform one or more medical imaging and diagnostic functions. In at least one embodiment, system 1700 may be communicatively coupled to (e.g., via encrypted links) PACS server networks of one or more facilities. In at least one embodiment, system 1700 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1602). In at least one embodiment, applications may then call or execute one or more services 1620 for performing compute, AI, or visualization tasks associated with respective applications, and software 1618 and/or services 1620 may leverage hardware 1622 to perform processing tasks in an effective and efficient manner.

In at least one embodiment, deployment system 1606 may execute deployment pipelines 1710. In at least one embodiment, deployment pipelines 1710 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1710 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1710 depending on information desired from data generated by a device. In at least one embodiment, where detections of anomalies are desired from an MIl machine, there may be a first deployment pipeline 1710, and where image enhancement is desired from output of an MRI machine, there may be a second deployment pipeline 1710.

In at least one embodiment, an image generation application may include a processing task that includes use of a machine learning model. In at least one embodiment, a user may desire to use their own machine learning model, or to select a machine learning model from model registry 1624. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1700—such as services 1620 and hardware 1622—deployment pipelines 1710 may be even more user friendly, provide for easier integration, and produce more accurate, efficient, and timely results.

In at least one embodiment, deployment system 1606 may include a user interface 1714 (e.g., a graphical user interface, a web interface, etc.) that may be used to select applications for inclusion in deployment pipeline(s) 1710, arrange applications, modify, or change applications or parameters or constructs thereof, use and interact with deployment pipeline(s) 1710 during set-up and/or deployment, and/or to otherwise interact with deployment system 1606. In at least one embodiment, although not illustrated with respect to training system 1604, user interface 1714 (or a different user interface) may be used for selecting models for use in deployment system 1606, for selecting models for training, or retraining, in training system 1604, and/or for otherwise interacting with training system 1604.

In at least one embodiment, pipeline manager 1712 may be used, in addition to an application orchestration system 1728, to manage interaction between applications or containers of deployment pipeline(s) 1710 and services 1620 and/or hardware 1622. In at least one embodiment, pipeline manager 1712 may be configured to facilitate interactions from application to application, from application to service 1620, and/or from application or service to hardware 1622. In at least one embodiment, although illustrated as included in software 1618, this is not intended to be limiting, and in some examples (e.g., as illustrated in FIG. 15) pipeline manager 1712 may be included in services 1620. In at least one embodiment, application orchestration system 1728 (e.g., Kubernetes, DOCKER, etc.) may include a container orchestration system that may group applications into containers as logical units for coordination, management, scaling, and deployment. In at least one embodiment, by associating applications from deployment pipeline(s) 1710 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1712 and application orchestration system 1728. In at least one embodiment, so long as an expected input and/or output of each container or application is known by a system (e.g., based on constructs of applications or containers), application orchestration system 1728 and/or pipeline manager 1712 may facilitate communication among and between, and sharing of resources among and between, each of applications or containers. In at least one embodiment, because one or more of applications or containers in deployment pipeline(s) 1710 may share same services and resources, application orchestration system 1728 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1728) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1620 leveraged by and shared by applications or containers in deployment system 1606 may include compute services 1716, AI services 1718, visualization services 1720, and/or other service types. In at least one embodiment, applications may call (e.g., execute) one or more of services 1620 to perform processing operations for an application. In at least one embodiment, compute services 1716 may be leveraged by applications to perform super-computing or other high-performance computing (HPC) tasks. In at least one embodiment, compute service(s) 1716 may be leveraged to perform parallel processing (e.g., using a parallel computing platform 1730) for processing data through one or more of applications and/or one or more tasks of a single application, substantially simultaneously. In at least one embodiment, parallel computing platform 1730 (e.g., NVIDIA's CUDA) may enable general purpose computing on GPUs (GPGPU) (e.g., GPUs 1722). In at least one embodiment, a software layer of parallel computing platform 1730 may provide access to virtual instruction sets and parallel computational elements of GPUs, for execution of compute kernels. In at least one embodiment, parallel computing platform 1730 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1730 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1718 may be leveraged to perform inferencing services for executing machine learning model(s) associated with applications (e.g., tasked with performing one or more processing tasks of an application). In at least one embodiment, AI services 1718 may leverage AI system 1724 to execute machine learning model(s) (e.g., neural networks, such as CNNs) for segmentation, reconstruction, object detection, feature detection, classification, and/or other inferencing tasks. In at least one embodiment, applications of deployment pipeline(s) 1710 may use one or more of output models 1616 from training system 1604 and/or other models of applications to perform inference on imaging data. In at least one embodiment, two or more examples of inferencing using application orchestration system 1728 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1728 may distribute resources (e.g., services 1620 and/or hardware 1622) based on priority paths for different inferencing tasks of AI services 1718.

In at least one embodiment, shared storage may be mounted to AI services 1718 within system 1700. In at least one embodiment, shared storage may operate as a cache (or other storage device type) and may be used to process inference requests from applications. In at least one embodiment, when an inference request is submitted, a request may be received by a set of API instances of deployment system 1606, and one or more instances may be selected (e.g., for best fit, for load balancing, etc.) to process a request. In at least one embodiment, to process a request, a request may be entered into a database, a machine learning model may be located from model registry 1624 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1712) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1620 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1726, and an inference service may perform inferencing on a GPU.

In at least one embodiment, visualization services 1720 may be leveraged to generate visualizations for viewing outputs of applications and/or deployment pipeline(s) 1710. In at least one embodiment, GPUs 1722 may be leveraged by visualization services 1720 to generate visualizations. In at least one embodiment, rendering effects, such as ray-tracing, may be implemented by visualization services 1720 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1720 may include an internal visualizer, cinematics, and/or other rendering or image processing capabilities or functionality (e.g., ray tracing, rasterization, internal optics, etc.).

In at least one embodiment, hardware 1622 may include GPUs 1722, AI system 1724, cloud 1726, and/or any other hardware used for executing training system 1604 and/or deployment system 1606. In at least one embodiment, GPUs 1722 (e.g., NVIDIA's TESLA and/or QUADRO GPUs) may include any number of GPUs that may be used for executing processing tasks of compute services 1716, AI services 1718, visualization services 1720, other services, and/or any of features or functionality of software 1618. For example, with respect to AI services 1718, GPUs 1722 may be used to perform pre-processing on imaging data (or other data types used by machine learning models), post-processing on outputs of machine learning models, and/or to perform inferencing (e.g., to execute machine learning models). In at least one embodiment, cloud 1726, AI system 1724, and/or other components of system 1700 may use GPUs 1722. In at least one embodiment, cloud 1726 may include a GPU-optimized platform for deep learning tasks. In at least one embodiment, AI system 1724 may use GPUs, and cloud 1726—or at least a portion tasked with deep learning or inferencing—may be executed using one or more AI systems 1724. As such, although hardware 1622 is illustrated as discrete components, this is not intended to be limiting, and any components of hardware 1622 may be combined with, or leveraged by, any other components of hardware 1622.

In at least one embodiment, AI system 1724 may include a purpose-built computing system (e.g., a super-computer or an HPC) configured for inferencing, deep learning, machine learning, and/or other artificial intelligence tasks. In at least one embodiment, AI system 1724 (e.g., NVIDIA's DGX) may include GPU-optimized software (e.g., a software stack) that may be executed using a plurality of GPUs 1722, in addition to DPUs, CPUs, RAM, storage, and/or other components, features, or functionality. In at least one embodiment, one or more AI systems 1724 may be implemented in cloud 1726 (e.g., in a data center) for performing some or all of AI-based processing tasks of system 1700.

In at least one embodiment, cloud 1726 may include a GPU-accelerated infrastructure (e.g., NVIDIA's NGC) that may provide a GPU-optimized platform for executing processing tasks of system 1700. In at least one embodiment, cloud 1726 may include an AI system(s) 1724 for performing one or more of AI-based tasks of system 1700 (e.g., as a hardware abstraction and scaling platform). In at least one embodiment, cloud 1726 may integrate with application orchestration system 1728 leveraging multiple GPUs to enable seamless scaling and load balancing between and among applications and services 1620. In at least one embodiment, cloud 1726 may tasked with executing at least some of services 1620 of system 1700, including compute services 1716, AI services 1718, and/or visualization services 1720, as described herein. In at least one embodiment, cloud 1726 may perform small and large batch inference (e.g., executing NVIDIA's TENSOR RT), provide an accelerated parallel computing API and platform 1730 (e.g., NVIDIA's CUDA), execute application orchestration system 1728 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1700.

Figure 18A:
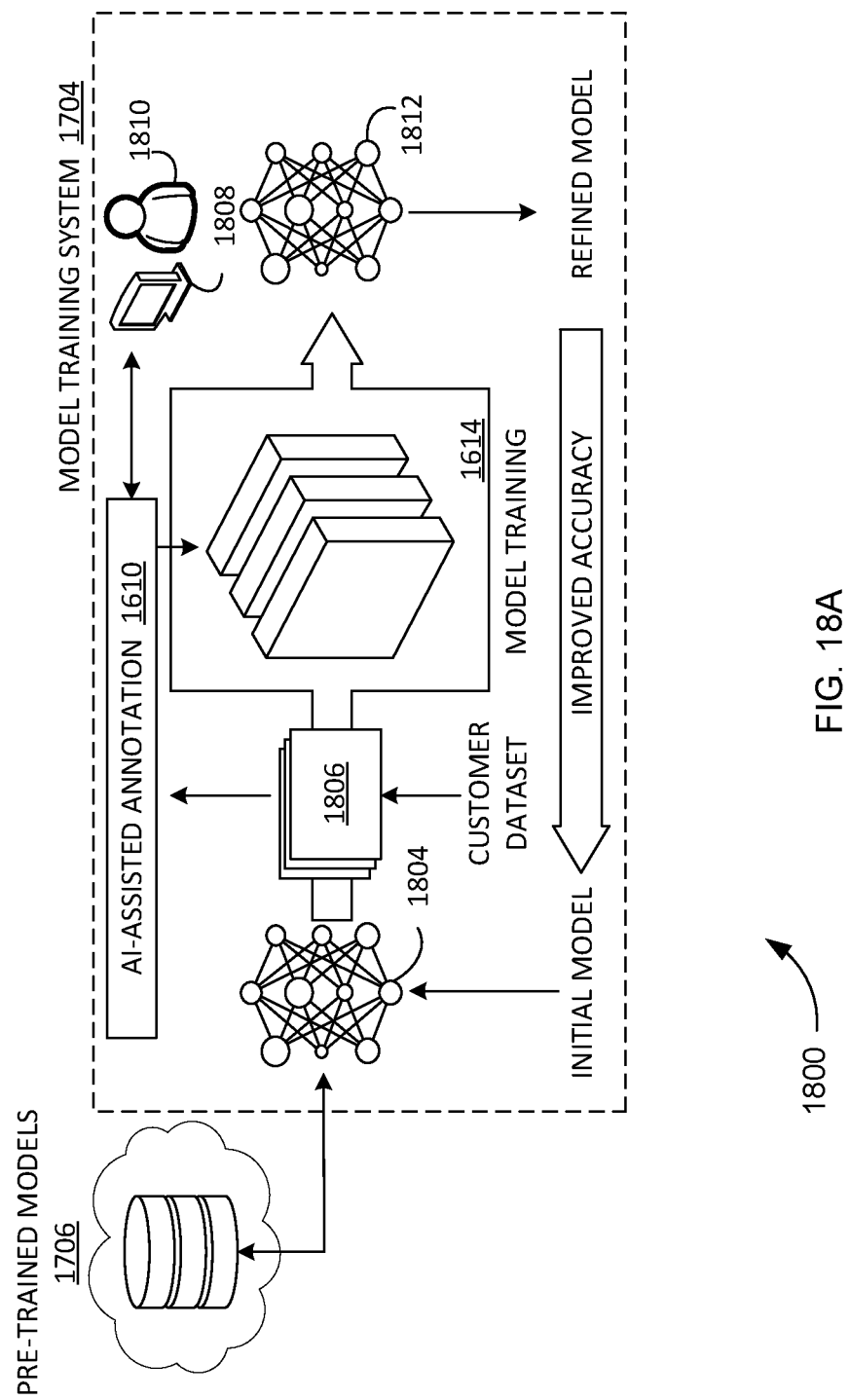
FIGS. 18A and 18B illustrate a data flow diagram for a process to train a machine learning model, as well as client-server architecture to enhance annotation tools with pre-trained annotation models, in accordance with at least some embodiments.

FIG. 18A illustrates a data flow diagram for a process 1800 to train, retrain, or update a machine learning model, in accordance with at least one embodiment. In at least one embodiment, process 1800 may be executed using, as a non-limiting example, system 1700 of FIG. 17. In at least one embodiment, process 1800 may leverage services 1620 and/or hardware 1622 of system 1700, as described herein. In at least one embodiment, refined models 1812 generated by process 1800 may be executed by deployment system 1606 for one or more containerized applications in deployment pipelines 1710.

In at least one embodiment, model training 1614 may include retraining or updating an initial model 1804 (e.g., a pre-trained model) using new training data (e.g., new input data, such as customer dataset 1806, and/or new ground truth data associated with input data). In at least one embodiment, to retrain, or update, initial model 1804, output or loss layer(s) of initial model 1804 may be reset, or deleted, and/or replaced with an updated or new output or loss layer(s). In at least one embodiment, initial model 1804 may have previously fine-tuned parameters (e.g., weights and/or biases) that remain from prior training, so training or retraining 1614 may not take as long or require as much processing as training a model from scratch. In at least one embodiment, during model training 1614, by having reset or replaced output or loss layer(s) of initial model 1804, parameters may be updated and re-tuned for a new data set based on loss calculations associated with accuracy of output or loss layer(s) at generating predictions on new, customer dataset 1806 (e.g., image data 1608 of FIG. 16).

In at least one embodiment, pre-trained models 1706 may be stored in a data store, or registry (e.g., model registry 1624 of FIG. 16). In at least one embodiment, pre-trained models 1706 may have been trained, at least in part, at one or more facilities other than a facility executing process 1800. In at least one embodiment, to protect privacy and rights of patients, subjects, or clients of different facilities, pre-trained models 1706 may have been trained, on-premise, using customer or patient data generated on-premise. In at least one embodiment, pre-trained models 1706 may be trained using cloud 1726 and/or other hardware 1622, but confidential, privacy protected patient data may not be transferred to, used by, or accessible to any components of cloud 1726 (or other off premise hardware). In at least one embodiment, where a pre-trained model 1706 is trained at using patient data from more than one facility, pre-trained model 1706 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1706 on-premise and/or off premise, such as in a datacenter or other cloud computing infrastructure.

In at least one embodiment, when selecting applications for use in deployment pipelines 1710, a user may also select machine learning models to be used for specific applications. In at least one embodiment, a user may not have a model for use, so a user may select a pre-trained model 1706 to use with an application. In at least one embodiment, pre-trained model 1706 may not be optimized for generating accurate results on customer dataset 1806 of a facility of a user (e.g., based on patient diversity, demographics, types of medical imaging devices used, etc.). In at least one embodiment, prior to deploying pre-trained model 1706 into deployment pipeline 1710 for use with an application(s), pre-trained model 1706 may be updated, retrained, and/or fine-tuned for use at a respective facility.

In at least one embodiment, a user may select pre-trained model 1706 that is to be updated, retrained, and/or fine-tuned, and pre-trained model 1706 may be referred to as initial model 1804 for training system 1604 within process 1800. In at least one embodiment, customer dataset 1806 (e.g., imaging data, genomics data, sequencing data, or other data types generated by devices at a facility) may be used to perform model training 1614 (which may include, without limitation, transfer learning) on initial model 1804 to generate refined model 1812. In at least one embodiment, ground truth data corresponding to customer dataset 1806 may be generated by training system 1604. In at least one embodiment, ground truth data may be generated, at least in part, by clinicians, scientists, doctors, practitioners, at a facility (e.g., as labeled clinic data 1612 of FIG. 16).

In at least one embodiment, AI-assisted annotation 1610 may be used in some examples to generate ground truth data. In at least one embodiment, AI-assisted annotation 1610 (e.g., implemented using an AI-assisted annotation SDK) may leverage machine learning models (e.g., neural networks) to generate suggested or predicted ground truth data for a customer dataset. In at least one embodiment, user 1810 may use annotation tools within a user interface (a graphical user interface (GUI)) on computing device 1808.

In at least one embodiment, user 1810 may interact with a GUI via computing device 1808 to edit or fine-tune (auto)annotations. In at least one embodiment, a polygon editing feature may be used to move vertices of a polygon to more accurate or fine-tuned locations.

In at least one embodiment, once customer dataset 1806 has associated ground truth data, ground truth data (e.g., from AI-assisted annotation, manual labeling, etc.) may be used by during model training 1614 to generate refined model 1812. In at least one embodiment, customer dataset 1806 may be applied to initial model 1804 any number of times, and ground truth data may be used to update parameters of initial model 1804 until an acceptable level of accuracy is attained for refined model 1812. In at least one embodiment, once refined model 1812 is generated, refined model 1812 may be deployed within one or more deployment pipelines 1710 at a facility for performing one or more processing tasks with respect to medical imaging data.

In at least one embodiment, refined model 1812 may be uploaded to pre-trained models 1706 in model registry 1624 to be selected by another facility. In at least one embodiment, his process may be completed at any number of facilities such that refined model 1812 may be further refined on new datasets any number of times to generate a more universal model.

Figure 18B:
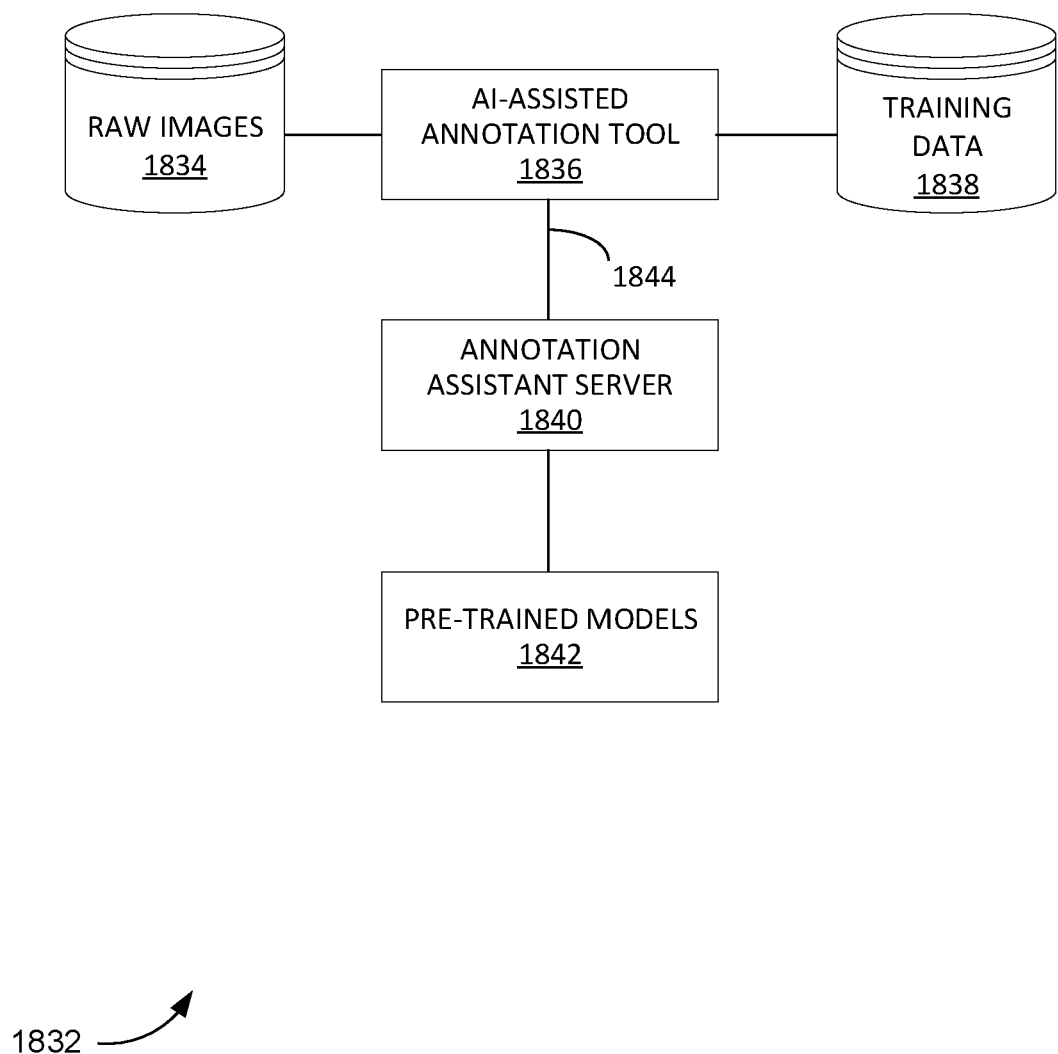

FIG. 18B is an example illustration of a client-server architecture 1832 to enhance annotation tools with pre-trained annotation models, in accordance with at least one embodiment. In at least one embodiment, AI-assisted annotation tools 1836 may be instantiated based on a client-server architecture 1832. In at least one embodiment, annotation tools 1836 in imaging applications may aid radiologists, for example, identify organs and abnormalities. In at least one embodiment, imaging applications may include software tools that help user 1810 to identify, as a non-limiting example, a few extreme points on a particular organ of interest in raw images 1834 (e.g., in a 3D MRI or CT scan) and receive auto-annotated results for all 2D slices of a particular organ. In at least one embodiment, results may be stored in a data store as training data 1838 and used as (for example and without limitation) ground truth data for training. In at least one embodiment, when computing device 1808 sends extreme points for AI-assisted annotation 1610, a deep learning model, for example, may receive this data as input and return inference results of a segmented organ or abnormality. In at least one embodiment, pre-instantiated annotation tools, such as AI-Assisted Annotation Tool 1836B in FIG. 18B, may be enhanced by making API calls (e.g., API Call 1844) to a server, such as an Annotation Assistant Server 1840 that may include a set of pre-trained models 1842 stored in an annotation model registry, for example. In at least one embodiment, an annotation model registry may store pre-trained models 1842 (e.g., machine learning models, such as deep learning models) that are pre-trained to perform AI-assisted annotation on a particular organ or abnormality. These models may be further updated by using training pipelines 1704. In at least one embodiment, pre-installed annotation tools may be improved over time as new labeled clinic data 1612 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, using a processing device, a first design state of a data path circuit;
   providing the first design state of the data path circuit as an input to a machine learning model; and
   performing one or more reinforcement learning techniques using the machine learning model to cause the machine learning model to output a final design state of the data path circuit, the one or more reinforcement learning techniques comprising:
     determining a first parameter value on a first parameter curve of a first physical data path circuit synthesized from the first design state, wherein the first parameter curve indicates a plurality of parameter values at one or more areas of the first physical data path circuit; and
     determining the final design state of the data path circuit, the final design state associated with a final parameter value, wherein the final design state is closer to a target than the first parameter value associated with the first design state.

2. The method of claim 1, wherein performing the one or more reinforcement learning techniques comprises:
   processing the first design state of the data path circuit using the machine learning model, wherein the machine learning model outputs a second design state of the data path circuit that is a modification of the first design state;
   determining a second parameter value for the second design state;
   updating the machine learning model based on a comparison of the first parameter value and the second parameter value; and
   processing the first design state or the second design state of the data path circuit using the updated machine learning model, wherein the updated machine learning model outputs a third design state of the data path circuit that is a modification of the first design state or the second design state.

3. The method of claim 2, further comprising:
   processing the first design state using a second model, wherein the second model outputs the first parameter value associated with the first design state;
   processing the second design state using the second model, wherein the second model outputs the second parameter value associated with the second design state; and
   making the comparison between the second parameter value and the first parameter value to determine which of the first parameter value and the second parameter value is closer to the target.

4. The method of claim 3, wherein:
   the machine learning model receives as an input a grid representation of a first graph of the first design state and outputs a grid representation of a second graph of the second design state; and
   the second model is a metrics predictor model that receives as a first input the grid representation of the first graph of the first design state and receives as a second input the grid representation of the second graph of the second design state.

5. The method of claim 3, the machine learning model receives as an input a grid representation of a first graph of the first design state and outputs an action to generate the grid representation of a second graph of the second design state, the method further comprising:
   converting the grid representation of the second graph of the second design state to a circuit implementation of the second design state;

wherein the second model receives as a first input a circuit implementation of the first design state and receives as a second input the circuit implementation of the second design state.

6. The method of claim 2, further comprising:
determining a difference between the second parameter value and the first parameter value, wherein the machine learning model is updated based on the difference.

7. The method of claim 2, further comprising:
processing the first design state using a circuit synthesis tool, wherein the circuit synthesis tool outputs the first parameter value associated with the first design state;
processing the second design state using the circuit synthesis tool, wherein the circuit synthesis tool outputs the second parameter value associated with the second design state; and
making the comparison between the second parameter value and the first parameter value to determine which of the first parameter value and the second parameter value is closer to the target.

8. The method of claim 7, wherein the circuit synthesis tool processes the first design state at least partially concurrent with the machine learning model outputting an action to generate the second design state of the data path circuit.

9. The method of claim 2, further comprising:
determining that the second design state is an invalid state before determining the second parameter value; and
modifying the second design state of the data path circuit to produce an updated second design state that is valid; wherein the second parameter value is determined from the updated second design state.

10. The method of claim 2, further comprising:
generating a first parallel prefix graph that represents the first design state; and
generating a grid representation of the first parallel prefix graph, wherein the grid representation of the first parallel prefix graph is provided as an input to the machine learning model, and wherein the machine learning model outputs an action or actions to construct a grid representation of a final parallel prefix graph that represents the final design state.

11. The method of claim 1, wherein the data path circuit comprises a parallel prefix circuit or a parallel prefix circuit with additional circuit logic connected to its inputs or outputs.

12. The method of claim 1, wherein the first parameter value and the final parameter value each represents at least one of: a prediction of an area associated with the data path circuit, a delay associated with the data path circuit, a power consumption associated with the data path circuit, or any combination thereof.

13. The method of claim 12, wherein the first parameter value and the final parameter value each represents at least one of: a prediction of a weighted value of the area associated with the data path circuit, the delay associated with the data path circuit, or the power consumption associated with the data path circuit.

14. The method of claim 1, wherein the machine learning model iteratively modifies a design state of the data path circuit from the first design state to the final design state, wherein each iteration comprises at least one of removing or adding a node of a graph of the data path circuit, wherein each node of the graph is associated with one or more components of the data path circuit.

15. A system comprising:
a first processing device to:
receive a first design state of a data path circuit; and
process the first design state of the data path circuit using a machine learning model, wherein the machine learning model is to generate an output comprising a second design state of the data path circuit that is a modification of the first design state; and
a second processing device configured to:
determine a first parameter value on a first parameter curve of a first physical data path circuit synthesized from the first design state and a second parameter value on a second parameter curve of a second physical data path circuit synthesized from the second design state, wherein the first parameter curve and the second parameter curve indicate a plurality of parameter values at one or more areas of the first physical data path circuit and the second physical data path circuit respectively;
determine a reward associated with the output based on a comparison of the first parameter value and the second parameter value; and
wherein the first processing device is further to update the machine learning model based on the reward; and
wherein after one or more updates to the machine learning model, the machine learning model is to output a final design state of the data path circuit, the final design state of the data path circuit being associated with a final parameter value that is closer to a target than a first parameter value associated with the first design state.

16. The system of claim 15, wherein the first processing device is further to:
process the first design state or the second design state of the data path circuit using the updated machine learning model; and
output a third design state of the data path circuit that is a modification of the first design state or the second design state.

17. The system of claim 15, wherein the second processing device is further to:
process the first design state using a second model, wherein the second model outputs the first parameter value associated with the first design state;
process the second design state using the second model, wherein the second model outputs the second parameter value associated with the first design state; and
compare the second parameter value and the first parameter value to determine which of the first parameter value and the second parameter value is closer to the target.

18. The system of claim 15, wherein at least one of the second processing device or a third processing device is further configured to:
generate the first physical data path circuit of the first design state using a circuit synthesis tool; and
generate the second physical data path circuit of the second design state using the circuit synthesis tool.

19. The system of claim 15, wherein the first processing device comprises a graphical processing unit (GPU) and the second processing device comprises a central processing unit (CPU).

20. A non-transitory computer-readable medium storing instructions thereon, wherein the instructions, when executed by a processing device, cause the processing device to:
receive a first design state of a data path circuit;
provide the first design state of the data path circuit as an input to a machine learning model; and apply one or more reinforcement learning techniques using the machine learning model to cause the machine learning model to output a final design state of the data path circuit, the one or more reinforcement learning techniques comprising:

determining a first parameter value on a first parameter curve of a first physical data path circuit synthesized from the first design state, wherein the first parameter curve indicates a plurality of parameter values at one or more areas of the first physical data path circuit; and determining the final design state of the data path circuit, the final design state associated with a final parameter value, wherein the final design state is closer to a target than the first parameter value associated with the first design state.

\* \* \* \* \*